United States Patent
Xu et al.

(10) Patent No.: US 9,547,881 B2
(45) Date of Patent: Jan. 17, 2017

(54) SYSTEMS AND METHODS FOR CALCULATING A FEATURE DESCRIPTOR

(71) Applicant: QUALCOMM Incorporated, San Diego, CA (US)

(72) Inventors: Qinwen Xu, San Diego, CA (US); Bo Zhou, San Diego, CA (US); Shuxue Quan, San Diego, CA (US); Junchen Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/629,307

(22) Filed: Feb. 23, 2015

(65) Prior Publication Data
US 2016/0225119 A1 Aug. 4, 2016

Related U.S. Application Data

(60) Provisional application No. 62/109,463, filed on Jan. 29, 2015.

(51) Int. Cl.
*G06T 1/20* (2006.01)
*G06T 1/60* (2006.01)

(52) U.S. Cl.
CPC .. *G06T 1/20* (2013.01); *G06T 1/60* (2013.01); *G06T 2200/28* (2013.01); *G06T 2207/20021* (2013.01)

(58) Field of Classification Search
CPC ............ G06T 1/20; G06T 1/60; G06F 9/3887; G06F 13/1657; G06F 13/1663; G06F 15/8053; G06F 9/3012; G06F 15/76; G06F 15/8007; G06F 9/30098; G06F 9/30101; G06F 9/355; G06F 9/3891
See application file for complete search history.

(56) References Cited

U.S. PATENT DOCUMENTS

| 3,824,532 A | * | 7/1974 | Vandierendonck | G01V 1/001 340/566 |
| 4,837,841 A | * | 6/1989 | Kasano | G06F 17/18 382/168 |
| 5,758,195 A | * | 5/1998 | Balmer | G06F 9/30032 712/221 |
| 7,506,135 B1 | * | 3/2009 | Mimar | G06F 15/8092 712/22 |

(Continued)

FOREIGN PATENT DOCUMENTS

| JP | 2012-221131 | * | 11/2012 | ............... G06T 1/20 |

OTHER PUBLICATIONS

Qualcomm Technologies, Inc., "Hexagon V5x Programmer's Reference Manual", 80-N2040-8 Rev. E, Oct. 21, 2014, pp. 1-692.

(Continued)

*Primary Examiner* — Jingge Wu
(74) *Attorney, Agent, or Firm* — Austin Rapp & Hardman

(57) ABSTRACT

A method for calculating a feature descriptor on a single instruction, multiple data (SIMD) processor is described. The method includes generating histogram bin indexes in a first register. The method also includes generating weights in a second register. The method further includes updating an entire histogram table in a register file based on the histogram bin indexes and the weights without storing any histogram bin to memory. Histogram bins are updated in parallel with a single instruction.

21 Claims, 15 Drawing Sheets

(56) References Cited

U.S. PATENT DOCUMENTS

| | | | |
|---|---|---|---|
| 8,441,489 B2 | 5/2013 | Chen | |
| 2009/0303264 A1* | 12/2009 | Toshima | G09G 3/3406 345/690 |
| 2011/0069903 A1* | 3/2011 | Oshikiri | G06T 5/002 382/264 |
| 2012/0131309 A1* | 5/2012 | Johnson | G06F 9/30 712/41 |
| 2013/0185539 A1* | 7/2013 | Hung | G06F 15/76 712/3 |
| 2013/0329076 A1* | 12/2013 | Shaw | H04N 5/23229 348/222.1 |
| 2014/0072217 A1* | 3/2014 | Xu | G06K 9/3275 382/170 |
| 2014/0344545 A1* | 11/2014 | Lerner | G06F 13/1663 711/168 |
| 2015/0193656 A1* | 7/2015 | Kounavis | G06T 7/2033 382/165 |

OTHER PUBLICATIONS

Qualcomm Technologies, Inc., "Hexagon V60 Vector Extensions Architecture Specification", 80-V9418-30 Rev. B, Oct. 21, 2014, pp. 1-230.

Fijany A., et al., "Image Processing Applications on a Low Power Highly Parallel SIMD Architecture," IEEE Aerospace Conference, 2011, pp. 1-12.

Medeiros H., "A parallel histogram-based particle filter for object tracking on SIMD-based smart cameras," Computer Vision and Image Understanding, 2010, pp. 1-9.

Misra I., et al., "HOG and Spatial Convolution on SIMD Architecture," CMU Tech Report, 2013, 7 pages.

* cited by examiner

FIG. 2

Example A 212a

Cell A 218a:
| Mag0 phase=100 | Mag1 phase=250 | Mag2 phase=50 | Mag3 phase=260 |
| Mag4 phase=.. | Mag5 phase=.. | Mag6 phase=.. | Mag7 phase=.. |
| Mag8 phase=.. | Mag9 phase=.. | Mag10 phase=.. | Mag11 phase=.. |
| Mag12 phase=.. | Mag13 phase=.. | Mag14 phase=.. | Mag15 phase=.. |

Histogram A 214a

| ... | +0.89*mag2 | +0.78*mag0 +0.11*mag2 | +0.22*mag0 | ... | +.44*mag1 +0.22*mag3 | +0.56*mag1 +0.78*mag3 | ... |

Example B 212b

Cell B 218b / Cell C 218c:
| Mag0 phase=100 | Mag1 phase=250 | Mag2 phase=50 | Mag3 phase=260 |
| Mag4 phase=.. | Mag5 phase=.. | Mag6 phase=.. | Mag7 phase=.. |
| Mag8 phase=.. | Mag9 phase=.. | Mag10 phase=.. | Mag11 phase=.. |
| Mag12 phase=.. | Mag13 phase=.. | Mag14 phase=.. | Mag15 phase=.. |

Histogram Table 216

Histogram B 214b (Cell B):
| ... | +0.89*mag2 | +0.78*mag0 +0.11*mag2 | +0.22*mag0 | ... | +0.44*mag1 +0.22*mag3 | +0.56*mag1 +0.78*mag3 |

Histogram C 214c (Cell C):
| ... | ... | ... | ... | ... | ... | ... |

US 9,547,881 B2

SYSTEMS AND METHODS FOR CALCULATING A FEATURE DESCRIPTOR

RELATED APPLICATIONS

This application is related to and claims priority to U.S. Provisional Patent Application Ser. No. 62/109,463, filed Jan. 29, 2015, for "SYSTEMS AND METHODS FOR CALCULATING A FEATURE DESCRIPTOR."

TECHNICAL FIELD

The present disclosure relates generally to electronic devices. More specifically, the present disclosure relates to systems and methods for calculating a feature descriptor.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture and/or utilize images. For example, a smartphone may capture and/or process still and/or video images. Processing images may demand a relatively large amount of time, memory and energy resources. The resources demanded may vary in accordance with the complexity of the processing.

It may be difficult to implement some complex processing tasks depending on the platform. For example, mobile platforms (e.g., mobile devices such as smartphones, tablets, laptop computers, etc.) may have limited processing, memory and/or energy resources (e.g., limited battery life). As can be observed from this discussion, systems and methods that improve image processing may be beneficial.

SUMMARY

A method for calculating a feature descriptor on a single instruction, multiple data (SIMD) processor is described. The method includes generating histogram bin indexes in a first register. The method also includes generating weights in a second register. The method further includes updating an entire histogram table in a register file based on the histogram bin indexes and the weights without storing any histogram bin to memory. Histogram bins are updated in parallel with a single instruction. The method may include calculating a BlurD feature descriptor or scale invariant feature transform (SIFT) feature descriptor based on the entire histogram table.

Each histogram bin index in the first register may include a first subset of bits and a second subset of bits. The first subset of bits may indicate a register in the histogram table and the second subset of bits may indicate an element of the register.

Each histogram in the histogram table may correspond to a cell of pixels in an image. Each histogram in the histogram table may be a weighted histogram of gradients (HOG). The entire histogram table may not be stored in the memory after being updated. Updating the entire histogram table may include accumulating weighted values in one or more of the histogram bins.

Each histogram in the histogram table may be stored in the register file as a vector. The entire histogram table may be stored in a set of consecutive registers in the register file.

An electronic device for calculating a feature descriptor is also described. The electronic device includes a processor. The electronic device also includes memory in electronic communication with the processor. The electronic device further includes instructions stored in memory. The instructions are executable to generate histogram bin indexes in a first register. The instructions are also executable to generate weights in a second register. The instructions are further executable to update an entire histogram table in a register file based on the histogram bin indexes and the weights without storing any histogram bin to memory. Histogram bins are updated in parallel with a single instruction.

A computer-program product for calculating a feature descriptor is also described. The computer-program product includes a non-transitory computer-readable medium with instructions. The instructions include code for causing an electronic device to generate histogram bin indexes in a first register. The instructions also include code for causing the electronic device to generate weights in a second register. The instructions further include code for causing the electronic device to update an entire histogram table in a register file based on the histogram bin indexes and the weights without storing any histogram bin to memory. Histogram bins are updated in parallel with a single instruction.

BRIEF DESCRIPTION OF THE DRAWINGS

FIG. 2 is a diagram illustrating examples of phase bin updating;

DETAILED DESCRIPTION

Systems and methods for efficient feature descriptor calculation on a single instruction, multiple data (SIMD) processor are disclosed herein. For example, blur detector (BlurD) and scale invariant feature transform (SIFT) descriptors are based on a weighted histogram of oriented gradients (WHOG). These local features (e.g., BlurD, SIFT, etc.) may be used in computer vision for object detection, robotic mapping and navigation, image stitching, three-dimensional (3D) modeling, gesture recognition and/or video tracking, etc. It should be noted that the BlurD descriptor is a derivative form of the original SIFT descriptor. The SIFT descriptor is one example of a local feature in computer vision.

Some approaches consider a histogram of oriented gradients (HOG) calculation as non-vectorizable due to an orientation binning procedure. These approaches cannot take full advantage of the computational capacity and register file of SIMD processors. Accordingly, the HOG may be processed pixel by pixel. In these approaches, the cell might be rotated and scaled, so the memory location for each cell may not be consecutive. Furthermore, the phase index within a cell may not be consecutive. For instance, the instruction set in these approaches may not allow access to discrete memory in one cycle. Additionally, the vote for the histogram (e.g., WHOG) may not usually be binary. Rather, it may come with magnitude or Gaussian weighing for a smoother descriptor.

Some configurations of the systems and methods disclosed herein may provide a scheme for accelerating WHOG calculation. For example, the systems and methods disclosed herein may improve the performance of BlurD and/or SIFT feature descriptor computation by processing vectorized data with SIMD instructions. For example, the instructions may enable computation of the weighted HOG for a vector of data in parallel. The vector length may depend on the SIMD processor. Some configurations of the systems and methods disclosed herein may provide an implementation of HOG calculation that may benefit other generalized forms of non-overlapped HOG. On a SIMD processor (e.g., Hexagon HVX) with one or more of the approaches disclosed herein, the packet number for overall BlurD/SIFT descriptor generation may be improved by approximately 16 times to 19 times. It should be noted that Hexagon Vector Extensions (HVX) is a set of instruction extensions to the Hexagon V60 processor architecture. The extensions may support high-performance imaging and computer vision applications.

Figure 1:
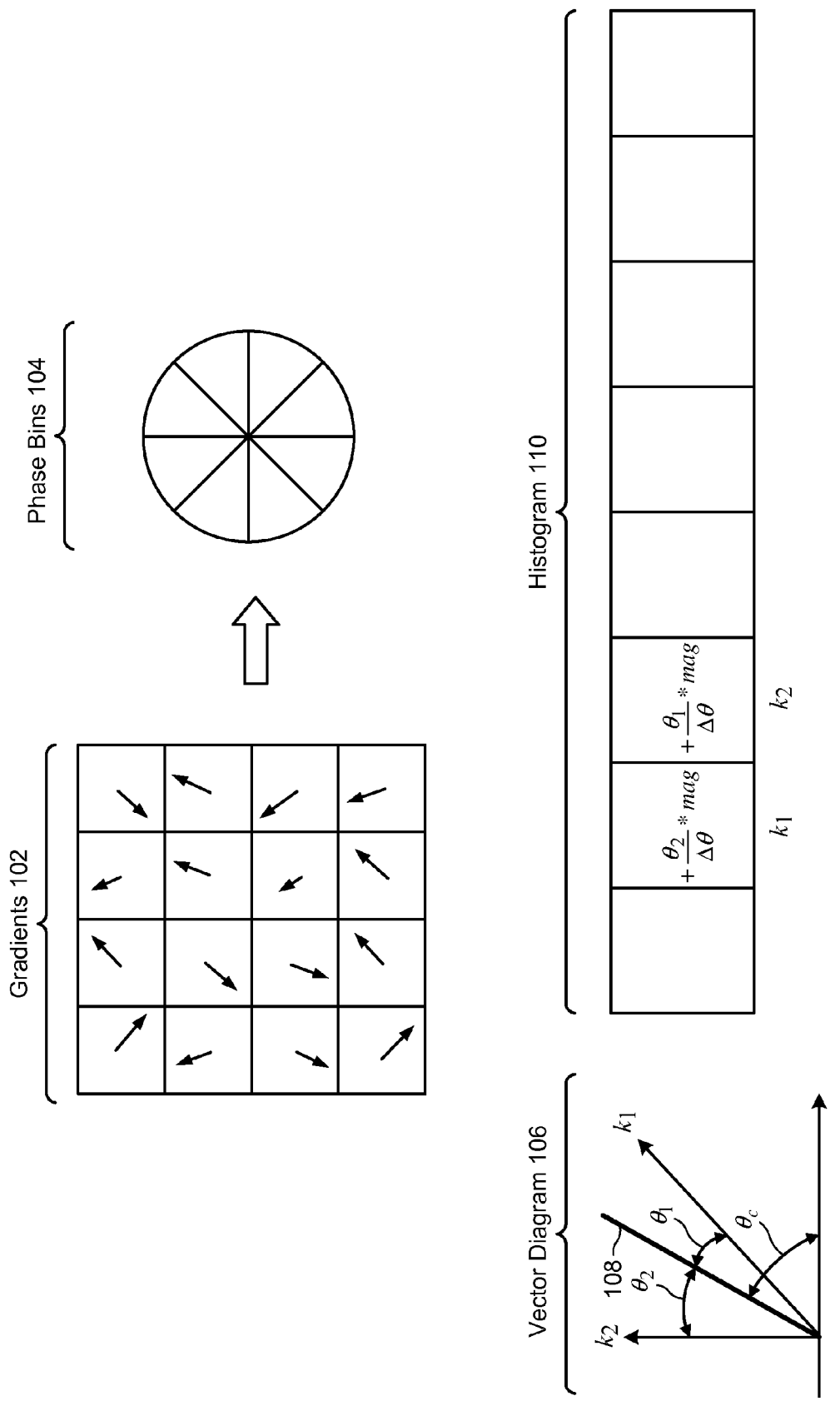
FIG. 1 is a diagram illustrating an example of an implementation of a weighted histogram of gradients (WHOG)

FIG. 1 is a diagram illustrating an example of an implementation of a weighted histogram of gradients (WHOG). An electronic device may calculate the HOG. In general, the HOG calculation represents the occurrence of gradient orientation in a localized portion of an image. The calculation of HOG may include one or more of the following procedures. The electronic device may compute gradients 102 corresponding to a cell/region of an image. The cell/region itself may be rectangular or radial in shape. In the example illustrated in FIG. 1, the gradients 102 are arranged in a grid to illustrate that each of the gradients 102 corresponds to a pixel in a square cell/region of an image.

The electronic device may perform orientation binning. In orientation binning, each pixel within a cell/region casts a weighted vote for an orientation-based histogram channel based on the value found in the gradient computation. The gradient orientation determines which phase bin(s) 104 are voted for. The vote weight may be the gradient magnitude itself or some function of the magnitude. The histogram channels may be evenly spread over 0 to 180 degrees or 0 to 360 degrees, depending on whether the gradient is "signed" or "unsigned." In some configurations, the electronic device may cascade histograms of all cells to form a complete final descriptor.

In the example of weighted HOG in FIG. 1, assume that the weighting of the HOG is the magnitude of the gradients 102, which has already been calculated. In this example, processing for single cell HOG may proceed as follows. Orientations of the pixels (e.g., orientations of the gradients 102) within a cell may be projected into spreading phase bins 104. For example, 8-phase-bin HOG is spread over 360 degrees for an unsigned orientation, where each bin represents a 45 degree direction. The 0th bin corresponds to 0 degrees, the 1st bin corresponds to 45 degrees, the 2nd bin corresponds to 90 degrees, the 3rd bin corresponds to 135 degree, the 4th bin corresponds to 180 degrees, the 5th bin corresponds to 225 degree, the 6th bin corresponds to 270 degrees and the 7th bin corresponds to 315 degrees.

When an orientation $\theta_c$ of a gradient falls between two adjacent phase bins, its weight is attributed between those two bins. For instance, assume that the orientation $\theta_c$ of a gradient 108 falls between phase bin indexes $k_1$ and $k_2$ as illustrated in the vector diagram 106. An electronic device may determine the two phase bins indexes (e.g., $k_1$ and $k_2$) as given in Equations (1)-(2) (where N is the number of phase bins and $\Delta\theta$ is a phase bin spacing).

$$k_1 = \left\lfloor \frac{\theta_c}{\Delta\theta} \right\rfloor; \; k_1 = 0, \ldots, N-1; \; \Delta\theta = \frac{360}{N} \tag{1}$$

$$k_2 = (k_1 + 1) \% N \tag{2}$$

The electronic device may update (e.g., accumulate) the gradient magnitude in corresponding phase bins of a histogram 110 as given in Equations (3)-(7) (where Hist(k) denotes the histogram 110 value at phase bin index k, $\theta_1$ is the angle between the gradient and the lower neighboring phase bin and $\theta_2$ is the angle between the gradient and the upper neighboring phase bin as illustrated in the vector diagram 106, for example). Updating the phase bins of the histogram 110 may be referred to as phase binning.

$$Hist(k) \mathrel{+}= 0, \text{ if } k \neq k_1, k_2 \tag{3}$$

$$Hist(k) \mathrel{+}= mag * \left(1 - \frac{\theta_c - \Delta\theta k_1}{\Delta\theta}\right), k = k_1 \tag{4}$$

$$Hist(k_1) \mathrel{+}= mag * \left(1 - \frac{\theta_c - \Delta\theta k_1}{\Delta\theta}\right) = mag * \frac{\Delta\theta k_2 - \theta_c}{\Delta\theta} = mag * \frac{\theta_2}{\Delta\theta} \tag{5}$$

$$Hist(k) \mathrel{+}= mag * \left(\frac{\theta_c - \Delta\theta k_1}{\Delta\theta}\right), k = k_2 \tag{6}$$

$$Hist(k_2) \mathrel{+}= mag * \left(\frac{\theta_c - \Delta\theta k_1}{\Delta\theta}\right) = mag * \frac{\theta_1}{\Delta\theta} \tag{7}$$

FIG. 2 is a diagram illustrating examples 212*a-b* of phase bin updating. Example A 212*a* illustrates cell A 218*a* and corresponding histogram A 214*a*. Cell A has 16 pixels. At pixel 0, the gradient phase=100 degrees, which falls between the 3rd phase bin and the 4th phase bin. Accordingly, the gradient at pixel 0 contributes 78% magnitude to the 2nd phase bin of histogram A 214*a* and 22% magnitude to the 3rd phase bin of histogram A 214*a*. Likewise, at pixel 1, the gradient phase=250 degree, which falls between the 5th phase bin and the 6th phase bin. Accordingly, the gradient at pixel 1 contributes 44% magnitude to the 5th phase bin of histogram A 214*a* and 56% magnitude to the 6th bin of histogram A 214*a*. It should be noted that the lower neighboring phase $$\text{bin} = \left\lfloor \frac{\text{phase}}{45°} \right\rfloor$$

in examples A-B 212*a-b* (where phase is the gradient phase of a pixel, for example).

Example B 212*b* illustrates multiple-cell cascaded HOG. In particular, example B 212*b* illustrates cell B 218*b* and cell C 218*c*. In multiple-cell cascaded HOG, each cell 218*b-c* has a corresponding histogram 214*b-c* and pixels within each cell 218*b-c* vote only for their corresponding histogram 214*b-c*. As illustrated in FIG. 2, multiple histograms (e.g., histogram B 214*b* and histogram C 214*c*) may form a histogram table 216. In some configurations, each row of a histogram table may correspond to a histogram and/or each column of a histogram table may correspond to a phase bin.

Figure 3:
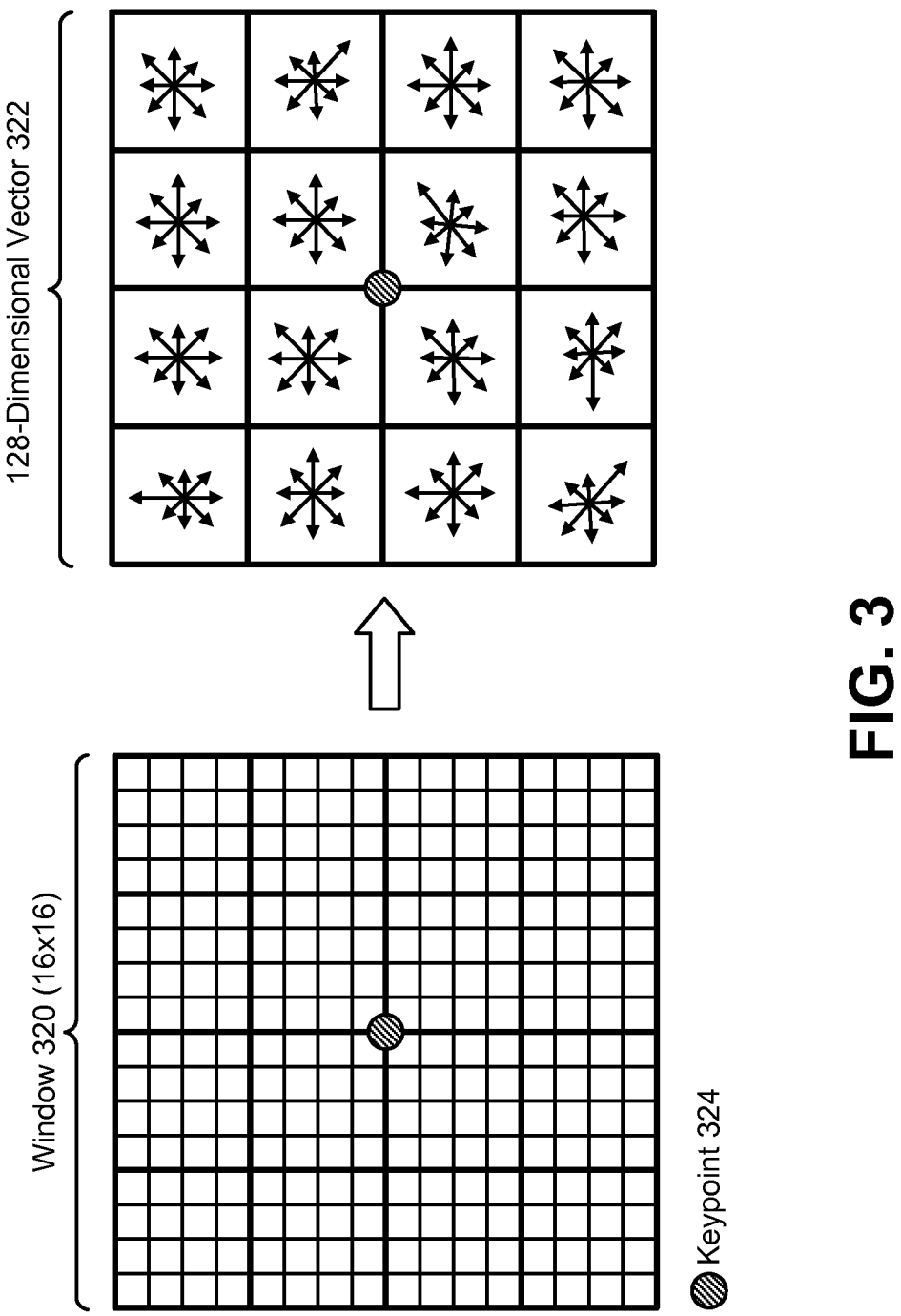
FIG. 3 is a diagram that provides an example of descriptor generation.

FIG. 3 is a diagram that provides an example of descriptor generation. Specifically, FIG. 3 illustrates an example of a window 320 and a 128-dimensional vector that is based on the window. In this example, the window 320 corresponds to a 16×16 pixel region of an image. Within the region are 16 sub-regions. In some configurations, these sub-regions may be cells or may correspond to cells (e.g., 4×4 pixel cells). The example given in FIG. 3 may apply to BlurD and SIFT descriptor generation.

In this example, a set of orientation histograms are created based on 4×4 cell neighborhoods, each with 8 phase bins. These histograms are computed from magnitude and orientation values of samples in a region around a keypoint 324 such that each histogram contains samples from a 4×4 sub-region (e.g., cell) of the original neighborhood region (e.g., window 320). The size of the region and/or the size(s) of one or more cells may be determined based on a property of the keypoint 324.

In some configurations, the magnitudes may be further weighted by a Gaussian function with a equal to one half the width of the descriptor window (e.g., window 320). The descriptor then becomes a vector of all the values of these histograms. In this example, the descriptor is formed by cascading 16 8-phase histograms to make a total 128 (16×8) elements (e.g., the 128-dimensional vector 322).

Figure 4:
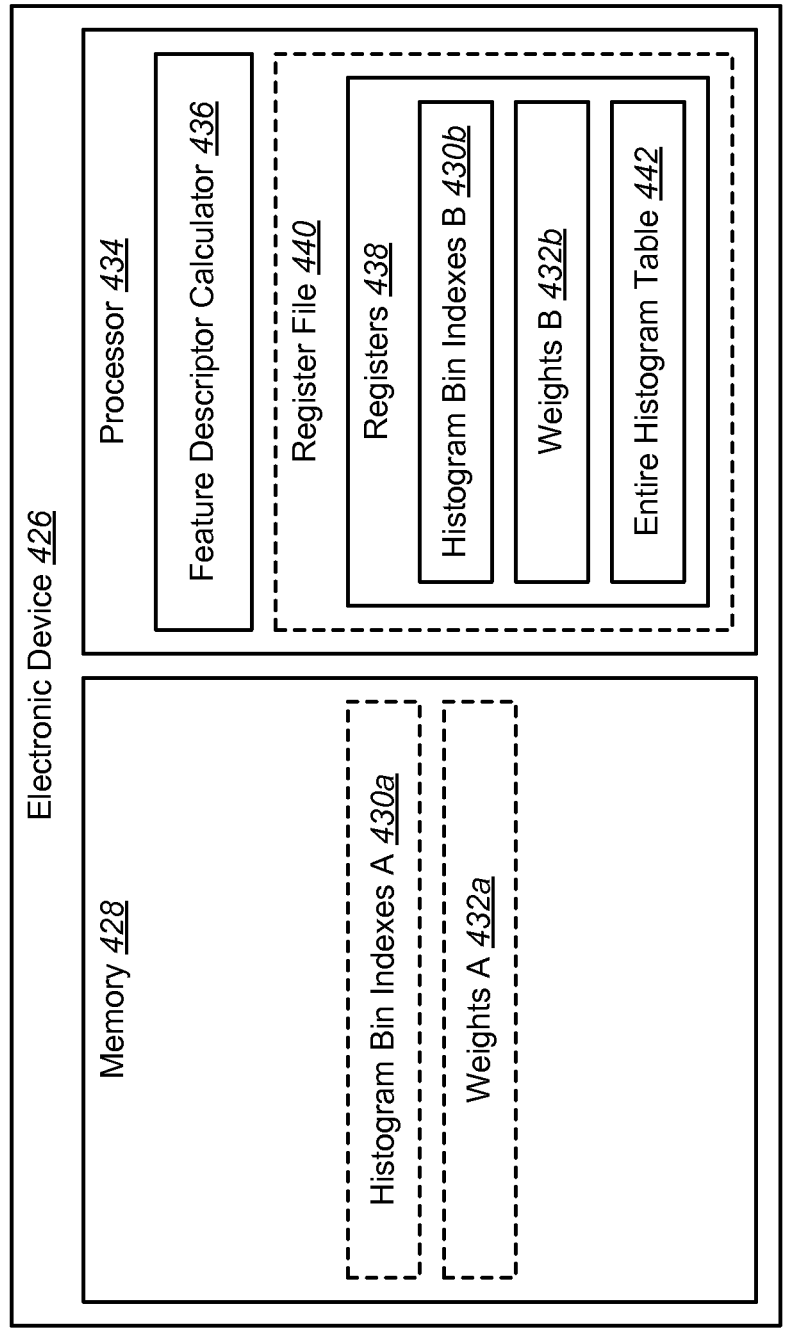
FIG. 4 is a block diagram illustrating one example of an electronic device in which systems and methods for calculating a feature descriptor may be implemented.

FIG. 4 is a block diagram illustrating one example of an electronic device 426 in which systems and methods for calculating a feature descriptor may be implemented. Examples of the electronic device 426 include smartphones, digital cameras, camcorders, cellular phones, computers (e.g., desktop computers, laptop computers, etc.), tablet devices, media players, televisions, gaming consoles, personal digital assistants (PDAs), etc. In some configurations, the electronic device 426 may perform one or more of the functions, procedures, methods, steps, etc., described in connection with one or more of FIGS. 1-3. Additionally or alternatively, the electronic device 426 may include one or more of the structures (e.g., algorithms) described in connection with one or more of FIGS. 1-3.

The electronic device 426 may include a processor 434 and memory 428. The processor 434 may include registers 438. The registers 438 may be storage that is implemented as part of the processor 434. For example, the registers 438 may be implemented in transistors as part of the processor 434. The registers 438 may store electronic data for the processor 434. For example, the processor 434 may perform operations on and/or manipulate the data stored in the registers 438. In some cases, the processor 434 may load data from the memory 428 into the registers. In other cases, the processor 434 may generate new data that is stored in the registers 438. In general, the processor 434 may access data stored in the registers 438 faster (e.g., much faster) than data stored in the memory 428. It should be noted that the registers 438 may include registers of different sizes. For example, the registers 438 may include a number of 8-bit registers, 16-bit registers, 32-bit registers, etc. In some configurations, a set of registers 438 may be defined (by the instruction set architecture of the processor 434, for example) for staging data between the memory 428 and functional units on the processor 434.

The processor 434 may include one or more register files 440. A register file 440 may include a group or set of registers 438 (e.g., an array of registers 438 included in the processor 434 (e.g., central processing unit (CPU)). For example, the register file 440 may be a contiguous set of registers 438. In some configurations, all of the registers 438 may be included in the register file 440. For instance, there may be only one register file 440 on the processor 434 (e.g., a single-threaded processor may typically include one register file 440). Accordingly, histogram bin indexes B 430*b*, weights B 432*b* and the entire histogram table 442 may be stored in one register file 440. In other configurations, each of multiple register files 440 may include a subset of the registers 438 on the processor 434. For instance, a first register file may include histogram bin indexes B 430*b* and weights B 432*b*, while a second register file may include the entire histogram table 442.

The processor 434 may be a single instruction, multiple data (SIMD) processor. For example, the processor 434 may be capable of manipulating (e.g., reading, operating on, updating, calculating, etc.) multiple register values in parallel. In other words, the processor 434 may be capable of manipulating multiple register values with a single processor cycle. Accordingly, the processor 434 may manipulate multiple register values simultaneously. As used herein, terms such as "in parallel" and "simultaneously" in the context of register processing may mean that multiple register values may be processed in a single processor cycle. Accordingly, each of the relevant register values may or may not be manipulated at exactly the same time.

The processor 434 may include a feature descriptor calculator 436. The feature descriptor calculator may be implemented in hardware (e.g., circuitry), or a combination of hardware and software (e.g., the processor 434 with instructions). It should be noted that instructions for the feature descriptor calculator 436 may reside in storage (e.g., a hard drive, in the memory 428 and/or in the registers 438). In some configurations, the feature descriptor calculator 436 may calculate a feature descriptor (e.g., BlurD, SIFT) as described in connection with one or more of FIGS. 1-3. For example, the feature descriptor calculator 436 may calculate one or more histograms (e.g., HOG, WHOG) as described above based on one or more images.

In some configurations, the electronic device 426 may obtain one or more images (e.g., digital images, video, etc.). For example, the electronic device 426 may capture one or more images (using an integrated and/or separate image sensor, for example) and/or may receive one or more images from another device (e.g., a camera, a storage device, another electronic device, etc.). One or more of the images may include an object (e.g., a target object for detection and/or tracking).

One or more of the images may be provided to the memory 428 and/or processor 434. The processor 434 may optionally compute histogram bin indexes and weights based on the image(s). For example, the processor 434 may generate (e.g., compute) a set of gradients corresponding to one or more windows (e.g., regions) and/or cells (e.g., sub-regions) of an image. Each of the gradients may correspond to a pixel. Each of the gradients may be expressed as a phase (e.g., angle) and a magnitude. Histogram bin indexes may indicate an address (e.g., index, pointer, etc.) of the gradient information (e.g., phase and magnitude).

Histogram bin indexes (e.g., histogram bin indexes B 430b) may indicate which bins to update in the entire histogram table 442 as a result of orientation binning according to gradient information (e.g., phase). In some configurations, histogram bin indexes may be combined with a cell index for a multi-cell-cascaded histogram table.

In some configurations, the histogram bin indexes may be generated as histogram bin indexes B 430b. For example, histogram bin indexes B 430b may be generated by the processor 434 and stored in a second register (of the registers 438). This may be accomplished, for instance, by generating (e.g., computing) histogram bin indexes B 430b through gradient information (e.g., phase) in accordance with the orientation binning approach described above. Accordingly, it may not be necessary to load histogram bin indexes from memory 428. For instance, histogram bin indexes B 430b may be in the registers 438 as a result of gradient calculation. Accordingly, histogram bin indexes B 430b may be utilized by the feature descriptor calculator 436 without being stored in memory 428.

In other configurations, the histogram bin indexes may be generated (e.g., computed by the processor 434 or by another processor and/or device) and stored as histogram bin indexes A 430a in memory 428. For example, if histogram bin indexes A 430a are pre-computed and stored in the memory 428, histogram bin indexes B 430b may be directly loaded to the registers 438 from the memory 428. In particular, the processor (e.g., feature descriptor calculator 436) may load weights A 432a into a second register (of the registers 438). For example, the processor 434 may request weights A 432a from memory 428 and may store weights A 432a as weights B 432b in the registers 438.

In some configurations, the weights may be generated as weights B 432b. For example, weights B 432b may be generated by the processor 434 and stored in the registers 438. In these configurations, it may not be necessary to load weights from memory 428. For instance, weights B 432b may be in the registers 438 as a result of gradient calculation. Accordingly, weights B 432b may be utilized by the feature descriptor calculator 436 without being stored in memory 428. In other configurations, the weights may be generated (e.g., computed by the processor 434 or by another processor and/or device) and stored as weights A 432a in memory 428. It should be noted that one or more of histogram bin indexes B 430b and weights B 432b may or may not be stored in the same register file 440 (e.g., histogram bin indexes B 430b and/or weights B 432b may be stored in the same register file or in separate register files).

Weights (e.g., weights A 432a and/or weights B 432b) may be the magnitudes corresponding to each of the gradients in some configurations. In other configurations, weights may be a function of the magnitudes corresponding to each of the gradients. In yet other configurations, each of the weights may be a magnitude multiplied by a distance from a keypoint. In yet other configurations, each of the weights may be a magnitude multiplied by a Gaussian filter.

As described above, the feature descriptor calculator 436 may calculate one or more feature descriptors based on the one or more images. Calculating the one or more feature descriptors may be based on histogram bin indexes (e.g., histogram bin indexes A 430a and/or histogram bin indexes B 430b) and weights (e.g., weights A 432a and/or weights B 432b).

In some configurations, the processor 434 (e.g., feature descriptor calculator 436) may optionally load histogram bin indexes A 430 into a first register (of the registers 438). For example, the processor 434 may request histogram bin indexes A 430a from memory 428 and may store histogram bin indexes A 430a as histogram bin indexes B 430b in the registers 438.

The processor 434 (e.g., feature descriptor calculator 436) may update an entire histogram table 442 (in a register file 440, for instance) based on histogram bin indexes B 430b and weights B 432b without storing any histogram bin to the memory 428. For example, an entire histogram table 442 in a register file 440 may be created and/or updated without storing (e.g., writing) any bin of the entire histogram table 442 to the memory 428.

The entire histogram table 442 may include one or more histograms. For example, the entire histogram table 442 may include one or multiple histograms with each histogram corresponding to a cell. In some configurations, the entire histogram table 442 may be stored in a set of consecutive registers in the register file 440. Additionally or alternatively, each of the histograms may be stored in the register file 440 as a vector and/or subset of registers. In some configurations, each of the histograms may correspond to a cell (e.g., a cell of pixels in an image). For example, the entire histogram table 442 may include histograms corresponding to all cells in a window. For instance, the entire histogram table 442 may include cascaded histograms, where each histogram corresponds to a cell in a window (e.g., a window that contains the cells corresponding to the histograms). In some configurations, each histogram may be a weighted histogram of gradients (WHOG), as described above in connection with one or more of FIGS. 1-3.

A number of histogram bins may be updated in parallel with a single instruction. In some configurations, for example, the image or a region of interest in the image to be processed may be divided into several segments (e.g., sub-regions, sub-blocks, etc.). All elements within a segment may be fed to the processor and may be processed (e.g., corresponding histogram bins may be updated) in parallel. The number of elements (e.g., N) in a segment (e.g., the length of the segment) may depend on the capability of the processor. For example, a processor may be able to process N elements with a single instruction. Accordingly, N histogram bins in the histogram table 442 may be updated in parallel with a single instruction for each segment of an image or region of interest of an image. For example, one or more histograms may be updated based on gradient information of each of the pixels within a region of interest of the image.

In some configurations, all cascaded histograms in the histogram table 442 may be updated together. The entire histogram table 442 may be processed once all pixels within the image or a region of interest in the image have been processed. For example, a number of instructions (e.g., total pixels/N) may be executed to obtain the final processed entire histogram table 442. For instance, the first single instruction may be executed to update a number of histogram bins using the first N pixels and a second single instruction may be executed to update a following number of histogram bins using the second (e.g., following) N pixels to update a following number of histogram bins. The number of histogram bins may correspond to a portion of a histogram, one or more entire histograms or a combination thereof.

For example, each histogram (e.g., a vector of histogram bins) may include multiple histogram bins. Updating the entire histogram table 442 may include accumulating weighted values in each histogram. For example, any of the histogram bins in a histogram that need to be updated based on all of the gradients in a cell (e.g., sub-region) may be updated in a single cycle of the processor 434. For instance, assume that six bins of an eight-bin histogram will be updated based on the gradients from a sixteen-pixel cell. All of the six bins may be updated by the processor 434 with a single instruction in a single cycle of the processor 434. A single instruction may be executed for each segment (e.g., for each N histogram bins). For example, a first single instruction may be executed for a first N histogram bins and a second single instruction may be executed for a second N histogram bins, where the first histogram and the second histogram are included in the entire histogram table 442.

It should be noted that "updating" a histogram bin may or may not include overwriting the histogram bin value in the registers 438 in some configurations. As illustrated above in connection with Equation (3), if none of the gradients in a cell impact the value of a histogram bin, then 0 may be added to that histogram bin. Alternatively, no add operation may be performed in this case. In some configurations, at least two histogram bins in a histogram may be overwritten when a histogram is updated. In some configurations, all histogram bins in a histogram may be overwritten (even if one or more of the histogram bins simply have "0" added).

Each histogram bin index of histogram bin indexes B 430b (e.g., each histogram bin index vector) indicates which bins to update in histogram table. In some configurations, each histogram bin index in the first register (that stores histogram bin indexes B 430b, for example) may include a first subset of bits and a second subset of bits. The first subset of bits may indicate a register in the histogram table 442 (e.g., may indicate and/or point to a register). The second subset of bits may indicate an element in the register. For example, the second subset of bits may indicate and/or point to an element in the register that is indicated by the first subset of bits. For example, the first subset of bits may indicate one dimension (e.g., a row or column) of the entire histogram table 442 that includes a register, while the second subset of bits may indicate another dimension (e.g., a column or row) of the entire histogram table 442 that specifies an element of a register. For instance, each histogram bin index may have two parts, the higher bits may be a register index used to locate a register, while the lower bits are the register offset used to locate an element in a register (or vice versa, for instance). Accordingly, the combination of these two parts may be utilized to locate the histogram bin in the register file. Additional detail is given below in connection with FIG. 9. In some configurations, cell indexes, register indexes and one or more register offsets may be utilized. In some approaches, cell indexes may be combined into register indexes. Then, the cascaded histogram table may be treated as a single histogram.

In some configurations, the entire histogram table 442 may not be stored in memory 428 after being updated. For example, the processor 434 may store only a portion of the entire histogram table 442 (e.g., one or more histogram bins and/or one or more histograms) to memory 428 after the entire histogram table 442 is updated.

Figure 5:
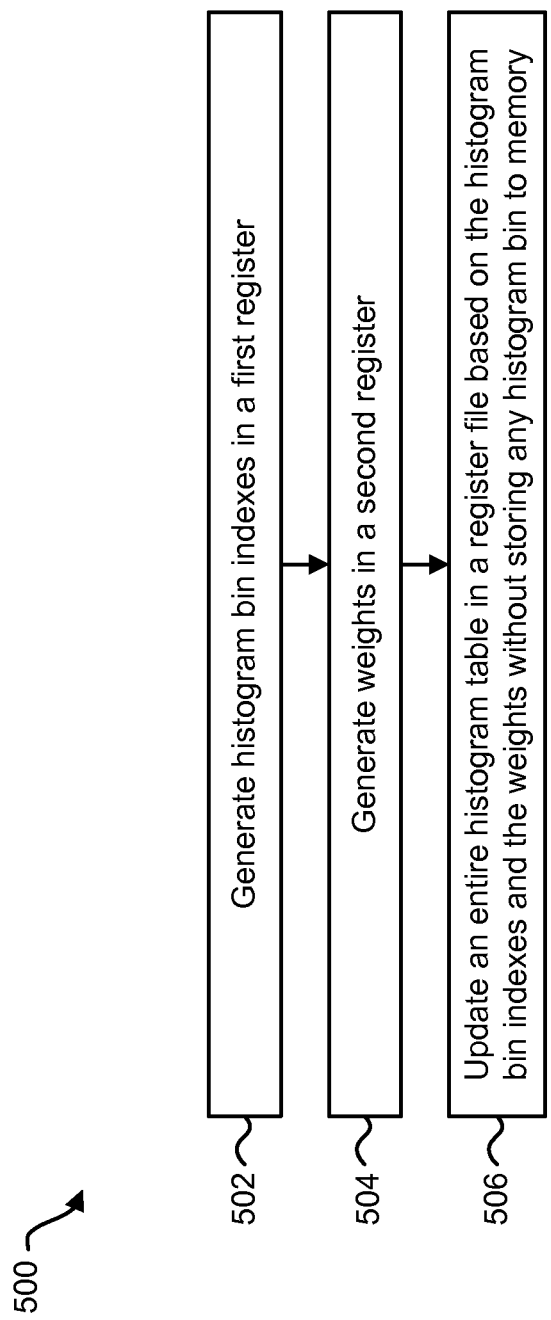
FIG. 5 is a flow diagram illustrating one configuration of a method for calculating a feature descriptor on a single instruction, multiple data (SIMD) processor.

FIG. 5 is a flow diagram illustrating one configuration of a method 500 for calculating a feature descriptor on a SIMD processor. The method 500 may be performed by the electronic device 426.

The electronic device 426 may generate 502 histogram bin indexes in a first register 438. This may be accomplished as described above in connection with FIG. 4. For example, the processor 434 may generate 502 histogram bin indexes B 430b directly in the first register. This may be done without storing the histogram bin indexes in memory 428 in some configurations. In another example, the processor 434 may generate 502 histogram bin indexes, which may be stored as histogram bin indexes A 430a in memory 428. The processor 434 may then request histogram bin indexes A 430a from memory 428 and may store histogram bin indexes A 430a as histogram bin indexes B 430b in the registers 438.

The electronic device 426 may generate 504 weights in a second register 438. This may be accomplished as described above in connection with FIG. 4. For example, the processor 434 may generate 504 weights B 432b directly in the second register. This may be done without storing the weights in memory 428 in some configurations. In another example, the processor 434 may generate 504 weights, which may be stored as weights A 432a in memory 428. The processor 434 may then request weights A 432a from memory 428 and may store weights A 432a as weights B 432b in the registers 438.

The electronic device 426 may update 506 an entire histogram table 442 in a register file 440 based on the histogram bin indexes and weights without storing any histogram bin to memory 428. This may be accomplished as described above in connection with FIG. 4. For example, while updating the entire histogram table 442, the electronic device 426 may not write (e.g., store) any histogram bin (e.g., any updated histogram bin) to memory 428. In some configurations, for instance, the processor 434 may loop through each segment (where the elements of each segment are calculated in parallel) in the region of interest of the image to update 506 the histogram table 442. No instruction to store a histogram and/or histogram bin to memory 428 may be included in that loop. Additionally or alternatively, no instruction to store a histogram and/or histogram bin to memory 428 may be executed during the loop. As described above, all histogram bins corresponding to a segment of the image may be updated in parallel with a single instruction. For example, this may be performed for each set of N histogram bins (corresponding to each segment of the image) in the entire histogram table 442. Additionally or alternatively, histogram bins corresponding to a vector of data (e.g., data elements) may be updated in parallel with a single instruction. For example, assuming N pixels may be processed per instruction, a number of instructions equal to the total number of pixels divided by N may be utilized to process the entire image.

It should be noted that histogram bins may or may not be updated based on all gradients in a cell in a single instruction. As described above, the histogram bins may be updated in parallel with a single instruction for each segment of the image region. Several instructions may be utilized to completely iterate through all pixels within a region of interest in an input image to get one or more final histograms. The length of the segment (e.g., how many elements can be processed in parallel) may depends on a SIMD processor hardware capability. In some configurations, all cascaded histograms may be updated together since they may be sequentially cascaded according to cell index to form a longer histogram table. These may be treated as a single histogram (or histogram table, for example).

Figure 6:
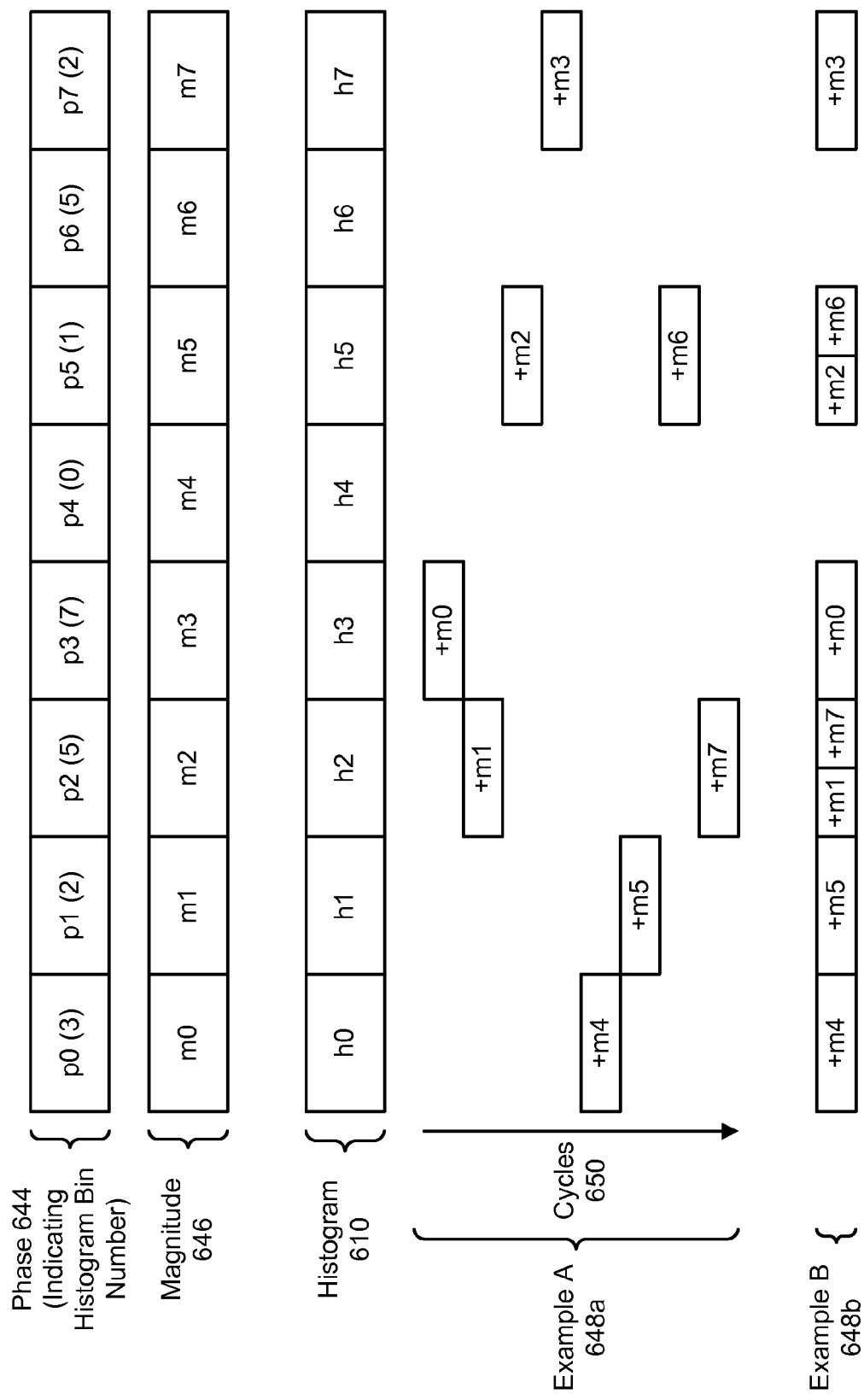
FIG. 6 is a diagram illustrating examples of weight accumulation in a histogram.

FIG. 6 is a diagram illustrating examples 648a-b of weight accumulation in a histogram 610. FIG. 6 illustrates an 8-bin HOG, 8-element vector example. In particular, FIG. 6 illustrates a set of phases 644 (e.g., p0, p1, p2, p3, p4, p5, p6 and p7) and a set of corresponding magnitudes 646 (e.g., m0, m1, m2, m3, m4, m5, m6, m7) that represent gradients for N=8 pixels. As indicated for the phases 644 in FIG. 6, each of the phases indicates a histogram bin that the corresponding magnitude will be accumulated into. For example, the p0 phase may indicate that the m0 magnitude should be accumulated into the h3 bin. During processing, the phases 644 and the magnitudes 646 may be loaded into processor registers.

In example A 648a, weights (e.g., magnitudes 646) are accumulated into the histogram 610 pixel by pixel. Additionally, the weighted histogram 610 is stored in external memory (e.g., memory that is external to the processor) in example A 648a. As illustrated in example A 648a, each of the magnitudes 646 are added (e.g., accumulated) to the histogram 610 pixel-by-pixel and one cycle at a time over 8 cycles 650. For instance, m0 is added to h3 in a first cycle, m1 is added to h2 in a second cycle, m2 is added to h5 in a third cycle, m3 is added to h7 in a fourth cycle, m4 is added to h0 in a fifth cycle, m5 is added to h1 in a sixth cycle, m6 is added to h5 in a seventh cycle and m7 is added to h2 in an eighth cycle. Moreover, each bin of the histogram is 610 has to retrieved from external memory and/or stored to external memory for each addition.

Example B 648b illustrates some aspects of the systems and methods disclosed herein. In particular, example B 648b illustrates an example of an implementation of WHOG in accordance with the systems and methods disclosed herein. In example B 648b, the histogram is stored in processor registers. Accordingly, accumulating the magnitudes may be performed without retrieving and/or storing a histogram bin at each cycle. In example B 648b, for instance, an entire or partial register file may be utilized as the weighted histogram 610, which avoids discrete memory address access. Furthermore, with the instruction described in accordance with the systems and methods herein, the WHOG may be processed in parallel for a vector of data (e.g., the histogram 610) on the SIMD processor. As illustrated in example B 648b, all of the magnitudes 646 may be accumulated to the histogram 610 with a single instruction (e.g., in a single cycle).

Figure 7:
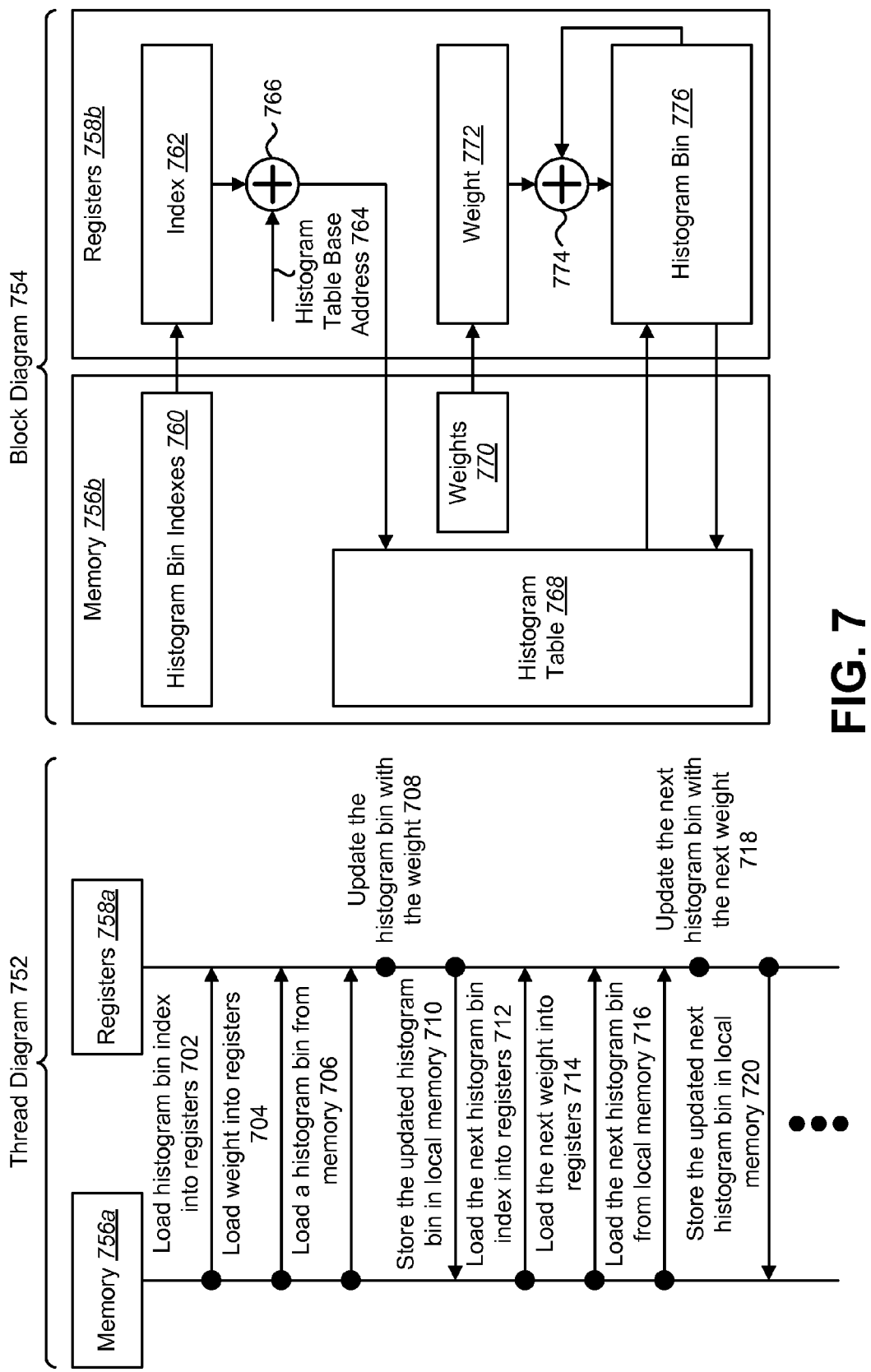
FIG. 7 includes a thread diagram and a block diagram according to one approach for updating a histogram bin.

FIG. 7 includes a thread diagram 752 and a block diagram 754 according to one approach for updating a histogram bin 776. In particular, FIG. 7 illustrates some of the major steps of weighted HOG processing in one approach. The approach described in connection with FIG. 7 utilizes per-pixel processing, which is inefficient in comparison with the systems and methods disclosed herein.

The thread diagram 752 illustrates several steps in accordance with the per-pixel approach. This approach may include loading 702 one histogram bin index from memory (e.g., external memory) 756a into registers 758a. A weight (e.g., a predetermined weight) may be loaded 704 from the memory 756a into the registers 758a. A histogram bin may be loaded 706 from the memory 756a into the registers 758a. This may include loading 706 the corresponding histogram bin entry from memory 756a based on an index in a register 758a. It should be noted that the histogram bin indexes 760 (e.g., index 762) in this approach may refer to an index in memory 756b (and not in the registers 758b, for instance).

At this point, the histogram bin may be updated 708 with the weight (e.g., the histogram entry may accumulate the weight). Upon updating, the updated histogram bin may be stored 710 back to memory 756a. As illustrated in FIG. 7, the procedure may be repeated for each pixel. For instance, after the first pixel is processed, the next histogram bin index may be loaded 712 into registers 758a, the next weight may be loaded 714 into the registers 758a, the next histogram bin may be loaded 716 from memory 756a, the next histogram bin may be updated 718 with the next weight, the updated next histogram bin may be stored 720 in memory 756a and so on for each pixel.

The block diagram 754 illustrates the same procedure. As illustrated, one of the histogram bin indexes 760 may be loaded as an index 762 into the registers 758b, one of the weights 770 may be loaded into the registers 758b as a weight 772, the histogram bin 776 may be loaded from a histogram table 768 in memory 756b (based on the histogram table base address 764 combined 766 with the index), the histogram bin 776 may be updated 774 with the weight 772, the updated histogram bin 776 may be stored in memory 756b and so on for each pixel.

Figure 8:
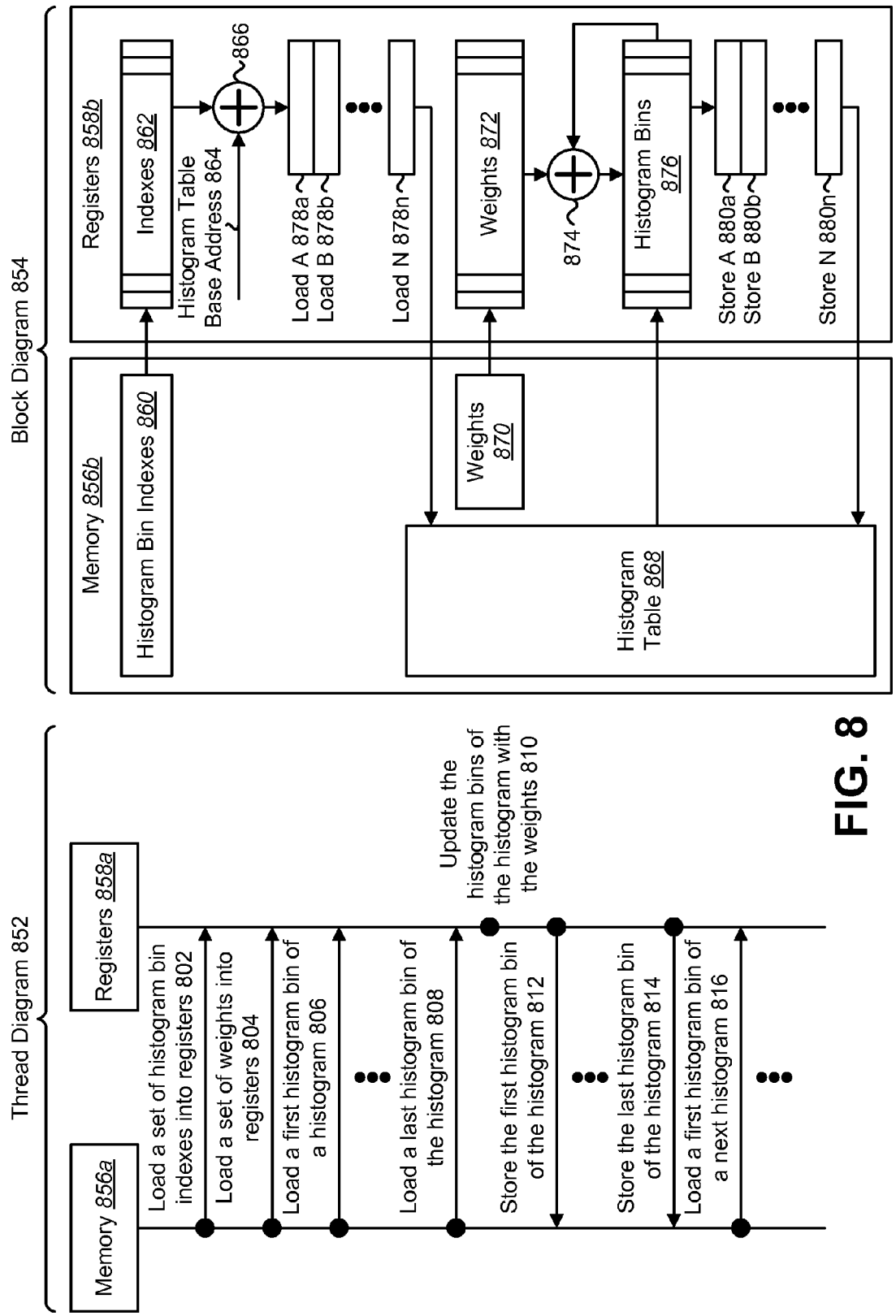
FIG. 8 includes a thread diagram and a block diagram according to another approach for updating histogram bins.

FIG. 8 includes a thread diagram 852 and a block diagram 854 according to another approach for updating histogram bins 876. In particular, FIG. 8 illustrates some of the major steps of weighted HOG processing in one approach. The approach described in connection with FIG. 8 utilizes SIMD processing with repeated loading from memory 856 and storing back to memory 856. The repeated loading and storing operations may add inefficiencies in comparison with the systems and methods disclosed herein.

The thread diagram 852 illustrates several steps in accordance with one approach. This approach may include loading 802 a set of histogram bin indexes from memory (e.g., external memory) 856a into registers 858a. For example, a vector of histogram bin indexes may be loaded 802 in a register, V1.

A set of weights (e.g., predetermined weights) may be loaded 804 from the memory 856a into the registers 858a. For example, a vector of predetermined weights may be loaded 804 in a register, V0.

A set of histogram bins may be loaded 806-808 from the memory 856a into the registers 858a. For example, a processor may execute a series (e.g., loop) of load instructions in order to load 806-808 each histogram bin in a histogram (e.g., vector of histogram bin values) to the registers. Accordingly, a first histogram bin may be loaded 806 followed by loading each histogram bin until the last histogram bin of the histogram is loaded 808. For instance, a vector of histogram bin values to be updated may be loaded 806-808 in a register, V2, with help of a look up table (LUT) unit in order to load 806-808 a vector of data from discrete addresses in parallel. For example, memory load requests of the histogram bins may be generated in parallel. The number of requests depends on the how scattered the bins are in memory 856b. In this approach, the best case is one request for all bins and the worst case is one request per bin. Loading may occur sequentially for each request. This may include loading 806-808 the corresponding histogram bin entries from memory 856a based on indexes in a register 858a.

At this point, the histogram bins may be updated 810 with the weight (e.g., an incremental value may be added to histogram bin values). Upon updating, the updated histogram bins (e.g., histogram bin values) may be stored 812-814 back to memory 856a. As illustrated in FIG. 8, the procedure may be repeated for each histogram. For instance, after the first set of histogram bins are processed, a first histogram bin of a next histogram may be loaded 816 into registers 858a and so on.

The block diagram 854 illustrates the same procedure. As illustrated, the histogram bin indexes 860 may be loaded as indexes 862 into the registers 858b and the weights 870 may be loaded into the registers 858b as weights 872. As illustrated in FIG. 8, loading the histogram bins 876 into the registers 858b from the histogram table 868 in memory 856b may be based on the histogram table base address 864 combined 866 with the indexes and a series of load instructions 878a-n. For example, each of the load instructions 878a-n may access a discrete address of the histogram table 868 in memory 856b. These loading operations may significantly slow the histogram update owing to bus latency and the slower speed of memory 856b accesses (in comparison to register 858a accesses, for example).

Upon loading the histogram bins 876, the histogram bins 876 may be updated 874 with the weights 872. The updated histogram bins 876 may be stored in memory 856b. As illustrated in FIG. 8, storing the histogram bins 876 into the registers 858b from the histogram table 868 in memory 856b may be based on a series of store instructions 880a-n. For example, each of the store instructions 880a-n may access (e.g., write to) a discrete address of the histogram table 868 in memory 856b. These storing operations may significantly slow the histogram update owing to bus latency and the slower speed of memory 856b accesses (in comparison to register 858a accesses, for example).

Figure 9:
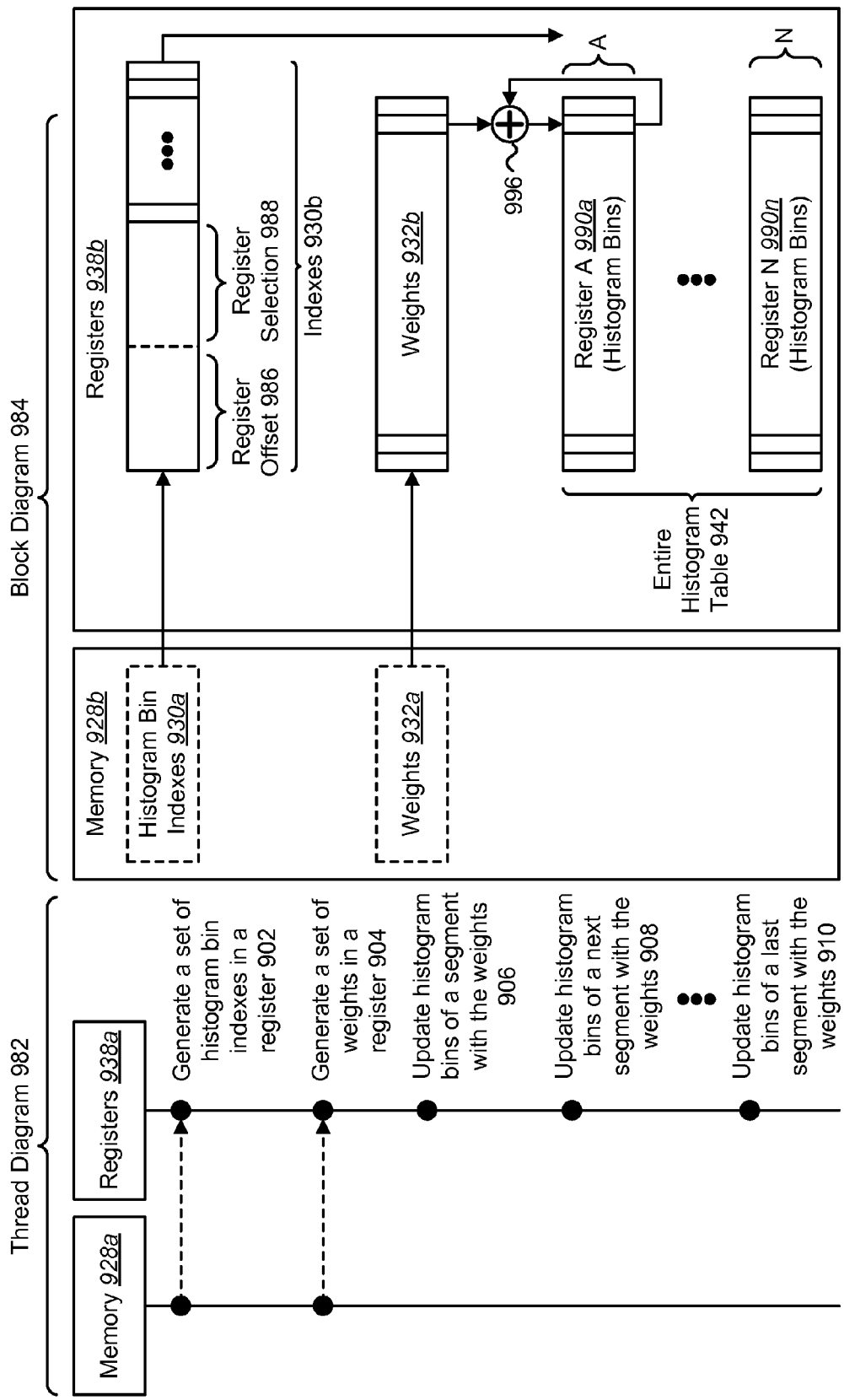
FIG. 9 includes a thread diagram and a block diagram according to the systems and methods disclosed herein.

FIG. 9 includes a thread diagram 982 and a block diagram 984 according to the systems and methods disclosed herein. In particular, FIG. 9 illustrates some of the major steps of weighted HOG processing in one example of the systems and methods disclosed herein. The approach described in connection with FIG. 9 utilizes SIMD processing for updating a histogram table without storing any histogram bin to memory. This approach improves processing speed and efficiency in comparison with other approaches (e.g., the approaches described in connection with FIGS. 7-8).

The thread diagram 982 illustrates several steps in accordance with one approach of the systems and methods disclosed herein. This approach may include generating 902 a set of histogram bin indexes in a register (e.g., a first register). Optionally, the set of histogram bin indexes may be stored to memory 928a and/or loaded from memory (e.g., external memory) 928a into the register. For example, a vector of histogram bin indexes may be loaded 902 in a register, V1.

A set of weights may be generated 904 in a register (e.g., a second register). Optionally, the set of weights (e.g., predetermined weights) may be stored to memory 928a and/or loaded from the memory 928a into the register. For example, a vector of predetermined weights may be loaded 904 in a register, V0. For configurations where the set of histogram bin indexes and the set of weights are loaded from memory 928a, it should be noted that the set of histogram bin indexes and the set of weights may be loaded in any order (e.g., indexes followed by weights, weights followed by indexes, concurrently, etc.).

Two or more histogram bins (that correspond to a segment, for example) may be updated 906 in parallel. For example, two or more histogram bins corresponding to a segment (where the histogram bins may be included in one or more histograms) may be updated 906 based on the weights. As illustrated in FIG. 9, the histogram bins of a next segment may be updated 908 and so on until the histogram bins of a last segment are updated 910. In some configurations, half-vector register files (VRF) (e.g., V15-V31) may be utilized to keep the entire histogram table in the registers 938a. Higher bits of each histogram bin index may be utilized for register selection and lower bits of each histogram bin index may be utilized for register offset (or vice versa, for example) to quickly locate all histogram entries to be updated.

The block diagram 984 illustrates memory 928b and registers 938b. The memory 928b illustrated in FIG. 9 may be one example of the memory 428 described in connection with FIG. 4. The registers 938b illustrated in FIG. 9 may be one example of the registers 438 described in connection with FIG. 4. The block diagram 984 illustrates the same procedure as described in connection with the thread diagram 982. As illustrated, the histogram bin indexes 930a may be generated (and/or optionally loaded) as indexes 930b in the registers 938b and the weights 932a may be generated (and/or optionally loaded) in the registers 938b as weights 932b.

Histogram bins in the registers 938b may be updated 996 with the weights 932b. As illustrated in FIG. 9, each histogram bin index 930b (in a first register 938b, for example) may include a first subset of bits and a second subset of bits. The first subset of bits (e.g., higher bits, such as the top 4 bits) may indicate register selection 988 (e.g., a register, such as register A 990a in FIG. 9). The second subset of bits (e.g., lower bits, such as the bottom 4 bits) may indicate a register offset 986 (e.g., a histogram bin, such as a histogram bin in register A 990a in FIG. 9). Histogram bins corresponding to a segment may be updated in parallel. For example, a series of sets of histogram bins may be updated, where each set of histogram bins corresponds to a segment. This procedure may be performed for the entire histogram table 942, from histogram bins stored in register A 990a (e.g., R0) to histogram bins stored in register N 990n (e.g., R15).

As illustrated in FIG. 9, the entire histogram table 942 may be stored in the registers 938b. The entire histogram table 942 may be updated without storing any histogram bin to memory. This is one benefit of the systems and methods disclosed herein in contrast to the approaches described in connection with FIG. 7-8. In particular, the systems and methods disclose herein avoid storing any bin of the entire histogram table 942 in external memory during updating. Accordingly, updating the entire histogram table 942 may be significantly faster and more efficient, thereby improving processor and electronic device performance.

More detailed comparison of the systems and methods disclosed herein versus other approaches is given as follows. The approach described in connection with FIG. 8 utilizes an instruction to load histogram bin entries to be updated from discrete addresses in memory 856b and pack them into a vector register and then applies a general vector adding instruction to accumulate predetermined weights 872. Finally, that approach utilizes an instruction to store updated histogram bin values to memory 856b. However, in accordance with one configuration of the systems and methods disclosed herein, a general vector calculation unit may be utilized to parallel locate the histogram bins to be updated in the histogram table 942, which are kept in registers 938b. The weights may then be accumulated. In this configuration, there is no need to load or store histogram bin entries from and to memory 928b each time a histogram is updated. This greatly reduces the load and store latency. Additionally, in some configurations, it is not necessary to store the entire histogram table 942 to memory 928b, even when the entire histogram table 942 is done updating. This may be implemented in configurations where only certain histogram bin entries are needed for subsequent processing.

In the approach described in connection with FIG. 8, a histogram unit is used with the help of a load/store unit to parallel process the weighted HOG. In contrast, some configurations of the systems and methods disclosed herein may utilize all (e.g., only) general-purpose vector calculation resources.

The approach described in connection with FIG. 8 utilizes a specially designed load/store unit to facilitate the distribution of the data retrieved from memory 856b to vector registers with a pattern specified by another vector register. This customized distribution may be arbitrary. This complex load/store unit makes vector table look-up/histogram possible as it enables loading from discrete memory and packing into an adjacent pattern in a vector.

Some configurations of the systems and methods disclosed herein avoid this load/store unit on the electronic device (e.g., mobile device) for several reasons. The speed gap between the processor and memory bus has become larger, and a large volume of data requests on the bus greatly reduces the efficiency of the processor. Bus requests for data may come in N bytes/transaction. In some worst cases, when data used for different lanes comes in totally discrete addresses, the efficiency of loading drops to only 1/N. This wastes not only the bandwidth for data transfer but also power consumption. For example, for a 4K60 (approximately 4,000 pixel resolution at 60 frames per second) video player, if the bandwidth is reduced by 50%, the power is reduced by 26%. Accordingly, some configurations of the systems and methods disclosed herein may avoid a complex load/store unit for cost, area and/or thermal reasons. Additionally, some configurations of the systems and methods disclosed herein may focus on improving processing latency. Accordingly, maintaining the histogram in registers (e.g., on VRF) may solve some efficiency problems of vector processing a weighted HOG.

Figure 10:
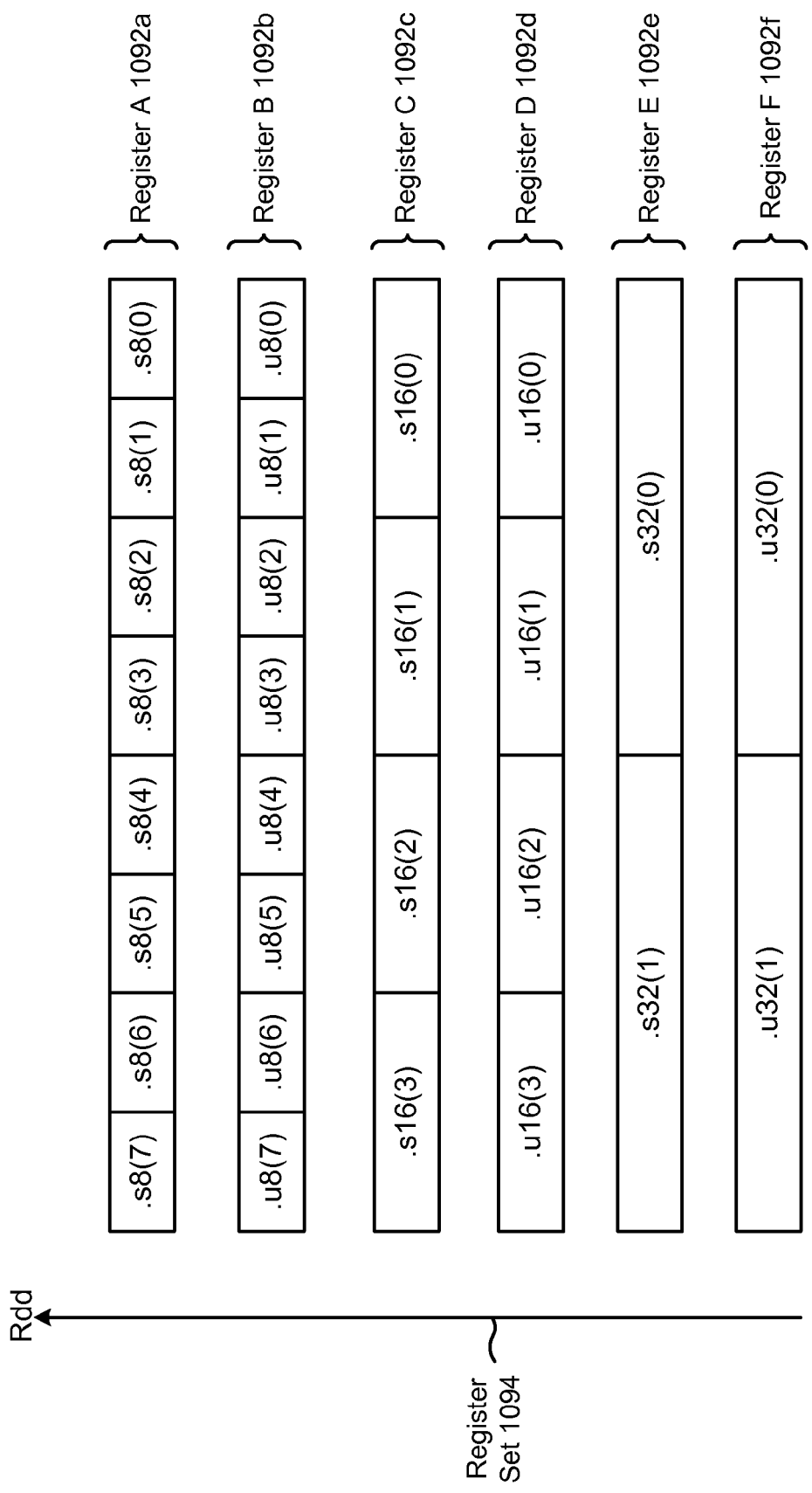
FIG. 10 is a diagram illustrating one example of a register structure that may be utilized in accordance with some configurations of the systems and methods disclosed herein.

FIG. 10 is a diagram illustrating one example of a register structure that may be utilized in accordance with some configurations of the systems and methods disclosed herein. In particular, FIG. 10 illustrates registers A-F 1092a-f. Register A 1092a includes 8 data elements, each with a size of 8 bits (1 byte). In this example, each of the data elements in register A 1092a is signed data (denoted by ".s"). Register B 1092b includes 8 data elements, each with a size of 8 bits (1 byte). In this example, each of the data elements in register B 1092b is unsigned data (denoted by ".u"). Register C 1092c includes 4 signed data elements, each with a size of 16 bits. Register D 1092d includes 4 unsigned data elements, each with a size of 16 bits. Register E 1092e includes 2 signed data elements, each with a size of 32 bits. Register F 1092f includes 2 unsigned data elements, each with a size of 32 bits.

Registers A-F 1092a-f may be included in a register set 1094. For example, a register set may be a set of 2 or more (e.g., 8 or more) registers. For instance, some processors may have 32 registers in general. In some configurations, one or more registers (e.g., one or more of registers A-F 1092a-f) may include 8 elements of 8 bits each, may include 4 elements of 16 bits each or may include 2 elements of 32 bits each. It should be noted that the length of a register may be shorter or longer depending on the processor. If the length of a register doubles, for example, the number of elements described above may double.

A register in a SIMD processor may refer to vector data that may be processed together in one instruction. For example, both data elements in register F 1092f may be accessed and/or manipulated in one instruction (e.g., in parallel). For example, vector data (e.g., multiple data elements) in a register may be accessed, assessed and/or manipulated in one instruction. The data length of register varies among different SIMD processors. On a Hexagon V5 processor, for example, a register may include 32 bits of data and a register pair may include 64 bits of data. One optional element size and type for calculation is shown in FIG. 10. This may be used to specify parts of a register, when the register is used as a vector. It should be noted that Rdd 1094 refers to a register pair. The register pair may double the processing data length when the same operation is applied on the two registers of the register pair.

The systems and methods disclosed herein provide instructions on SIMD processors. In some configurations, these instructions may be written as a function definition WHOG(Ru/Rt(VRF), Rss.h). For example, this function may implement the calculation of a weighted HOG based on a resulting histogram table stored in one or more vector register files (e.g., a set of some registers, an input vector register file (VRF), etc.). In a 512-bit register processor, Ru/Rs is a 512-bit register and Rss is a 1024-bit register pair. This instruction has 64 weights (unsigned 8-bit or unsigned 16-bit) in Rs/Rss. The Ru register contains 64 histogram offset for each element. The offset information could also be loaded at the address Rt. It should be noted that ".b" and ".h" may indicate the data type used in an operation. In one example, Rs.b uses 64 elements, where ".b" indicates that each element is a byte (e.g., 8 bits of data). In another example, Rs.h uses 32 elements, where ".h" indicates that each element is a half-word (e.g., 16 bits of data). The final results of weighted HOG may be stored in 16 consecutive registers (e.g., R16-R31), where each histogram bin is 32-bit word. Accordingly, the complete HOG may occupy 128 bins×32-bit word=4096 bits. The behavior of the functions is described in connection with FIG. 11.

Figure 11:
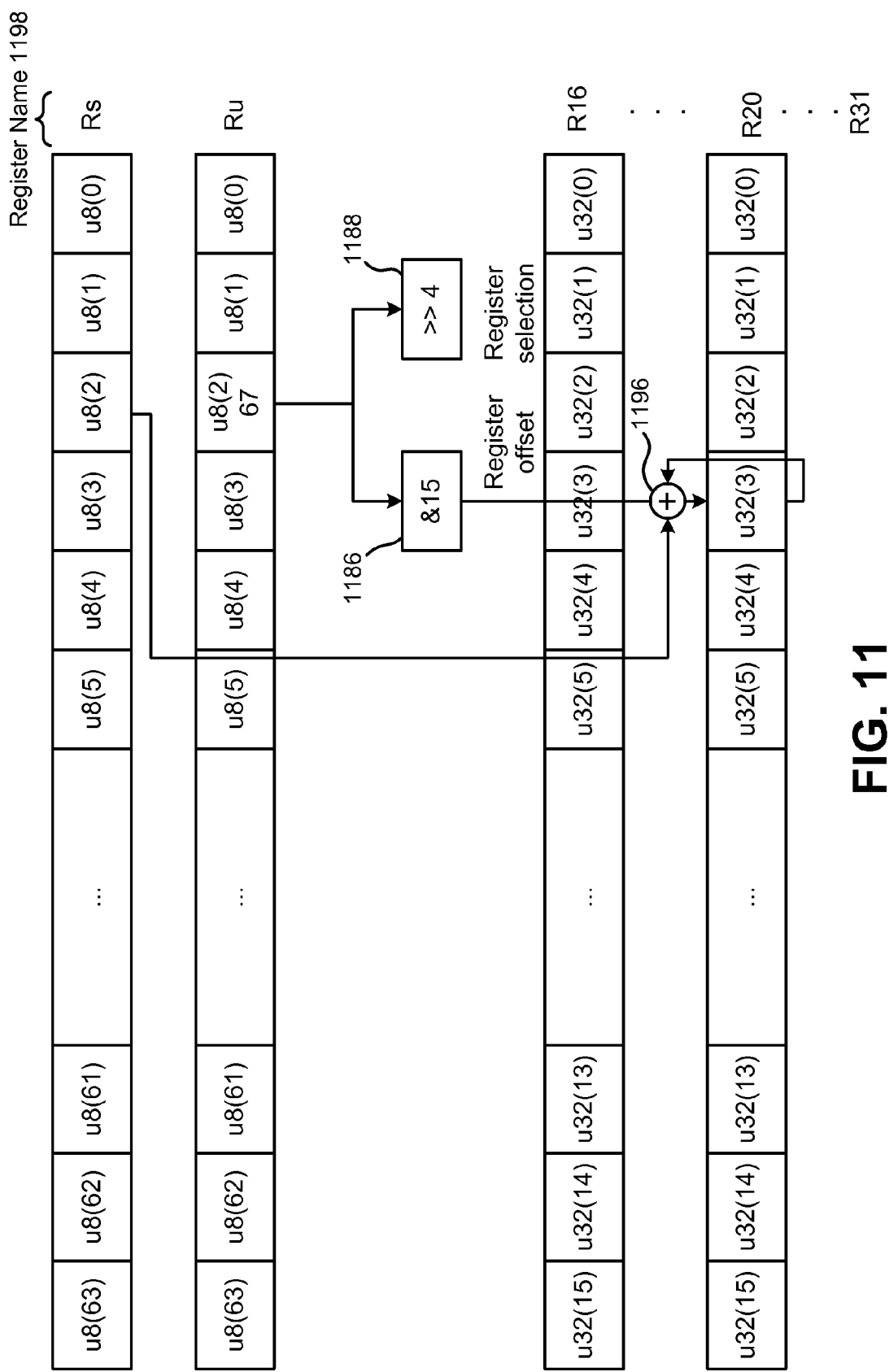
FIG. 11 is a diagram illustrating one example of calculating a WHOG in accordance with the systems and methods disclosed herein.

FIG. 11 is a diagram illustrating one example of calculating a WHOG in accordance with the systems and methods disclosed herein. In particular, FIG. 11 illustrates the behavior of functions WHOG(Ru, Rs.b) and WHOG(Ru, Rss.h) as described in connection with FIG. 10. One example of function behavior for the WHOG(Ru, Rs.b) function is given in Listing (1).

Listing (1)

```
WHOG(Ru, Rs.b)
  for (i = 0; i < VELEM(8); i++) {
    index(i) = Ru.b(i)>>4, offset(i) = Ru.b(i)&0x0f
    R<START_REG+index(i)>.w[offset(i)] += Rs.b(i)
  }
```

In Listing (1), START_REG refers to the starting index of the registers (e.g., register set(s)) that a processor configures to hold the histogram table. START_REG may be an arbitrary number and may be configured by the processor. The variable i indicates each 8-bit element in register. In this example, each offset comes from the lower 4 bits of the 8-bit element in a register. VELEM(8) indicates how many 8-bit data elements there are in a register. For example, for a 512 bit register, there are 64 8-bit data elements, 32 16-bit data elements or 16 32-bit data elements. Accordingly, for example, VELEM(8)=64, VELEM(16)=32 and VELEM (32)=16.

One example of function behavior for the WHOG(Ru, Rss.h) is given in Listing (2).

Listing (2)

```
WHOG(Ru, Rss.h)
  for (i = 0; i < VELEM(8); i++) {
    index(i) = Ru.b(i)>>4, offset(i) = Ru.b(i)&0x0f
    R<START_REG+index(i)>.w[offset(i)] += Rss.h(i)
  }
```

The example illustrated in FIG. 11 shows several registers with register names 1198. For instance, registers Rs, Ru and R16-R31 are shown. In this example, an Rs register includes a weight and an Ru register includes a histogram bin index. As illustrated, the 8-bit word u8(2) in the Ru register may include register selection bits 1188 and register offset bits 1186. The register selection bits 1188 indicate register R20 and the register offset bits 1186 indicate u32(3). As illustrated, u32(3) in R20 may be updated 1196 with the previous value of u32(3) in R20 in combination with the weight from u8(2) in Rs.

In some configurations, the WHOG may be processed in a vector of size N. It should be noted that N may be chosen based on processor's capability. For example, the WHOG calculation may be implemented on a Hexagon V60/HVX processor. In this example, the set of instructions may utilize all of the HVX processor core resources, such as the register file and calculation pipes. In some configurations, the 32 vector registers may be configured as two 256-entry histograms, where the histogram bins each have a width of 32 bits. For example, a histogram entry may range from 1-256. This allows up to 16 megabits of 8-bit elements (e.g., weights) or 65535 16-bit elements of the same value to be accumulated. With large register files, another SIMD processor may have similar instructions implemented.

In accordance with the systems and methods disclosed herein, the generated WHOG may be utilized in one or more applications. For example, the WHOG may be applied to determine SIFT and/or BlurD descriptors. For instance, the electronic device may calculate the WHOG in order to obtain BlurD and/or SIFT descriptors (that use a cascaded 4x4 cell of 8-phase-bin WHOGs as described in connection with FIG. 3, for example). It should be noted that the systems and methods disclosed herein may be applied to obtain a different form of cascading WHOG (with a maximum of 256 entries, for example). Additionally or alternatively, the WHOG may be applied to determine a weighted median filter (where weights may be pre-calculated in some configurations). Further examples and detail about the systems and methods disclosed herein (e.g., specific applications) are described in connection with FIGS. 12-13.

Figure 12:
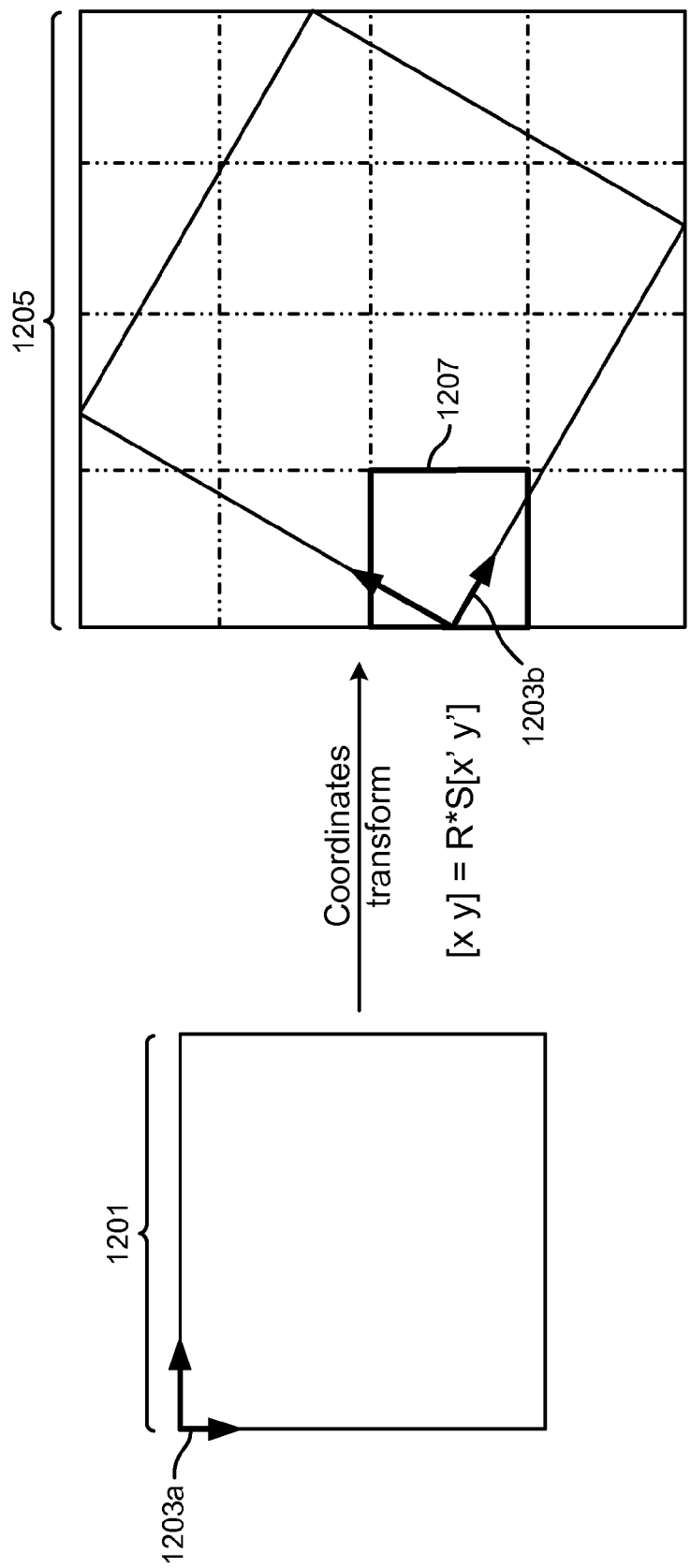
FIG. 12 is a diagram illustrating one example of a blur detector (BlurD) feature descriptor that may be computed in accordance with the systems and methods disclosed herein.

FIG. 12 is a diagram illustrating one example of a BlurD feature descriptor that may be computed in accordance with the systems and methods disclosed herein. The BlurD feature descriptor may be determined based on the WHOG calculation described herein. In particular, FIG. 12 illustrates a BlurD feature descriptor implementation in accordance with the systems and methods disclosed herein.

Coordinate transformation and WHoG may be two steps of BlurD feature calculation. The BlurD feature may be utilized to calculate rotation-invariant features. The WHoG may be calculated within a rotated patch, where rotation orientation may be determined by the principal orientation of a pre-selected patch. Accordingly, in some configurations, a coordinate transformation may be performed followed by calculating a WHoG.

For example, a coordinate transform may be computed (by the electronic device 426, for instance). As illustrated in FIG. 12, coordinates 1203a of an object 1201 may be transformed from original coordinates 1205 into transformed coordinates 1203b. More specifically, each of the coordinates may be projected in rectified coordinates to determine a cell bin 1207 in accordance with Equation (8).

$$\begin{pmatrix} x\_index \\ y\_index \end{pmatrix} = R * S * \begin{pmatrix} x \\ y \end{pmatrix} \quad (8)$$

In Equation (8), R is a rotation matrix and S is a scaling matrix. Accordingly, Equation (8) describes one example of a coordinate transformation.

In some configurations, phase binning may be carried out as described in connection with FIG. 1. For example, according to the phase offset, a phase bin may be determined and adjacent bins may be interpolated.

One example of the systems and methods disclosed is given in Listing (3) (which is Hexagon HVX ASM code). Specifically, Listing (3) is an example of BlurD descriptor implementation code on a Hexagon HVX processor. In this example, there are a total of 12 packets for 32 input pixels within the main loop, which achieves 0.375 packet/pixel. This has demonstrated 16x gain compared to 6 packet/pixel of another approach.

Listing (3)

```
//R0:srcMag/srcPhase interleaved source pointer
//R7:6 increment of Y
//V9:8 increment of X
//R11:10 nx,ny
//V11:theta0
//V10 =
31| 30| 29| 28| 27| 26| 25| 24|
23| 22| 21| 20| 19| 18| 17| 16|
15| 14| 13| 12| 11| 10| 9| 8|
7| 6| 5| 4| 3| 2| 1| 0|
    {
      Loop0(.mainhistloop0,R1)
      V0 = VMEMU(R0++#1)            //[load interleaved phase / mag ]
    }
    {
        V4 = VSPLAT(R10)      //[nx2            ]
    }
```

Listing (3)

```
{
    V6 = VSPLAT(R11)            //[ny2                      ]
    V1:0 = VZXT(V0.ub)          //[extend mag/phase to halfword ]
    V5 = V4
    IF(R1 == 0) JUMP:NT .remaining
}
.falign
.mainhistloop0:
{
    V7 = V6
    V2.h = VSUB(V1.h,V11.h)     //[phase − phase0           ]
    V5:4.uw += VMPY(V8.uh,V10.uh)  //[nx + nx_col*i         ]
}
{
    V2 = VAND(V2,0x255)
    V3 = VAND(V2,0x31)          //[upper weight            ]
    V7:6.uw += VMPY(V9.uh,V10.uh)  //[ny + ny_col*i         ]
}
{
    V4.h = VSHFFO(V5.h,V4.h)    //[x_bin index: nx_col >> 16 ]
    V1.h = VASR(V2.h,#3)        //[lower index             ]
    V3.h = VMPYI(V0.h,V3.h)     //[mag*upper weight        ]
}
{
    V6.h = VSHFFO(V7.h,V6.h)    //[y_bin index: ny_col >> 16 ]
    V2 = VSUB(#32,V1)           //[lower weight            ]
    Q0 = VCMP.EQ(V1,#7)         //[compare lower index to 7 ]
    V4.h = VADD(V4.h,#center_offset/R) //[adding center offset  ]
}
{
    V4.h += VMPYI(V6.h,0x04)    //[y_bin * 4 + x_bin       ]
    V5.h = VADD(V1.h,#1)        //[upper index             ]
}
{
    V4.h = VASL(V4.h,#3)        //[(y_bin * 4 + x_bin) *8  ]
    V2.h = VMPYI(V0.h,V2.h)     //[mag*lower weight        ]
    V5 = VMUX(Q0,#0,V5)         //[wrap upper index if >7  ]
}
{
    V4.h = VADD(V4.h,V1.h)      //[lower index             ]
    V5.h = VADD(V4.h,V5.h)      //[upper index             ]
    Q2 = VCMP.GT(V4.h,#256)     //[check out of boundary case ]
}
{
    V0 = VMEMU(R0++#1)          //[load interleaved phase/mag ]
    V2 = VMUX(Q2,#0,V2)         //[assign weight 0 for OB case ]
}
{
    V7.b = VPACK(V5.uh,V4.uh)
    V4 = VSPLAT(R10)            //[nx2                     ]
    V3 = VMUX(Q2,#0,V3)         //[assign weight 0 for OB case ]
}
{
    V6 = VSPLAT(R11)            //[ny2                     ]
    V1:0 = VZXT(V0.ub)          //[extend mag/phase to halfword ]
    V5 = V4
}
{
    WHOG(V7,V3:2)
}
{
    HOG (V7)
}:endloop0
.falign
.remaining:
{
    V7 = V6
    V2.h = VSUB(V1.h,V11.h)     //[phase − phase0          ]
    V5:4.uw += VMPY(V8.uh,V10.uh)  //[nx + nx_col*i         ]
}
{
    V2 = VAND(V2,0x255)
    V3 = VAND(V2,0x31)          //[upper weight            ]
    V7:6.uw += VMPY(V9.uh,V10.uh)  //[ny + ny_col*i         ]
}
{
    V4.h = VSHFFO(V5.h,V4.h)    //[x_bin index: nx_col >> 16 ]
```

Listing (3)

```
    V1.h = VASR(V2.h,#3)         //[lower index          ]
    V3.h = VMPYI(V0.h,V3.h)      //[mag*upper weight        ]
}
{
    V6.h = VSHFFO(V7.h,V6.h)     //[y_bin index: ny_col >> 16  ]
    V2 = VSUB(#32,V1)            //[lower weight        ]
    Q0 = VCMP.EQ(V1,#7)          //[compare lower index to 7 ]
    V4.h = VADD(V4.h,#center_offset/R) //[adding center offset    ]
}
{
    V4.h += VMPYI(V6.h,0x04)     //[y_bin * 4 + x_bin    ]
    V5.h = VADD(V1.h,#1)         //[upper index         ]
}
{
    V4.h = VASL(V4.h,#3)         //[(y_bin * 4 + x_bin) *8   ]
    V2.h = VMPYI(V0.h,V2.h)      //[mag*lower weight  ]
    V5 = VMUX(Q0,#0,V5)          //[wrap upper index if >7  ]
}
{
    V4.h = VADD(V4.h,V1.h)       //[lower index         ]
    V5.h = VADD(V4.h,V5.h)       //[upper index         ]
    Q2 = VCMP.GT(V4.h,#256)      //[check out of boundary case ]
}
{
    V2 = VMUX(Q2,#0,V2)          //[assign weight 0 for OB case]
    V3 = VMUX(Q2,#0,V3)          //[assign weight 0 for OB case]
}
{
    V0.b = VPACK(V5.uh,V4.uh)
}
{
    R11:10 = VADDW(R11:10,R7:6)  //[move coordinates to next line ]
}
{
    WHOG(V0,V3:2)
}
{
    HOG(V0)
}:endloop1
```

It should be noted that a complete implementation may utilize the assistance of a HOG function, whose behavior is similar to WHOG. One example of the HOG(Ru) function is given in Listing (4). HOG(Ru) may use 4 consecutive registers in some configurations (e.g., R12, R13, R14 and R15).

Listing (4)

```
HOG(Ru)
    for (i = 0; i < VELEM(8); i++) {
      index(i) = Ru.b(i)>>6, offset(i) = Ru.b(i)&0x7
      R<START_REG+index(i)>.b[offset(i)] += 1
    }
```

Figure 13:
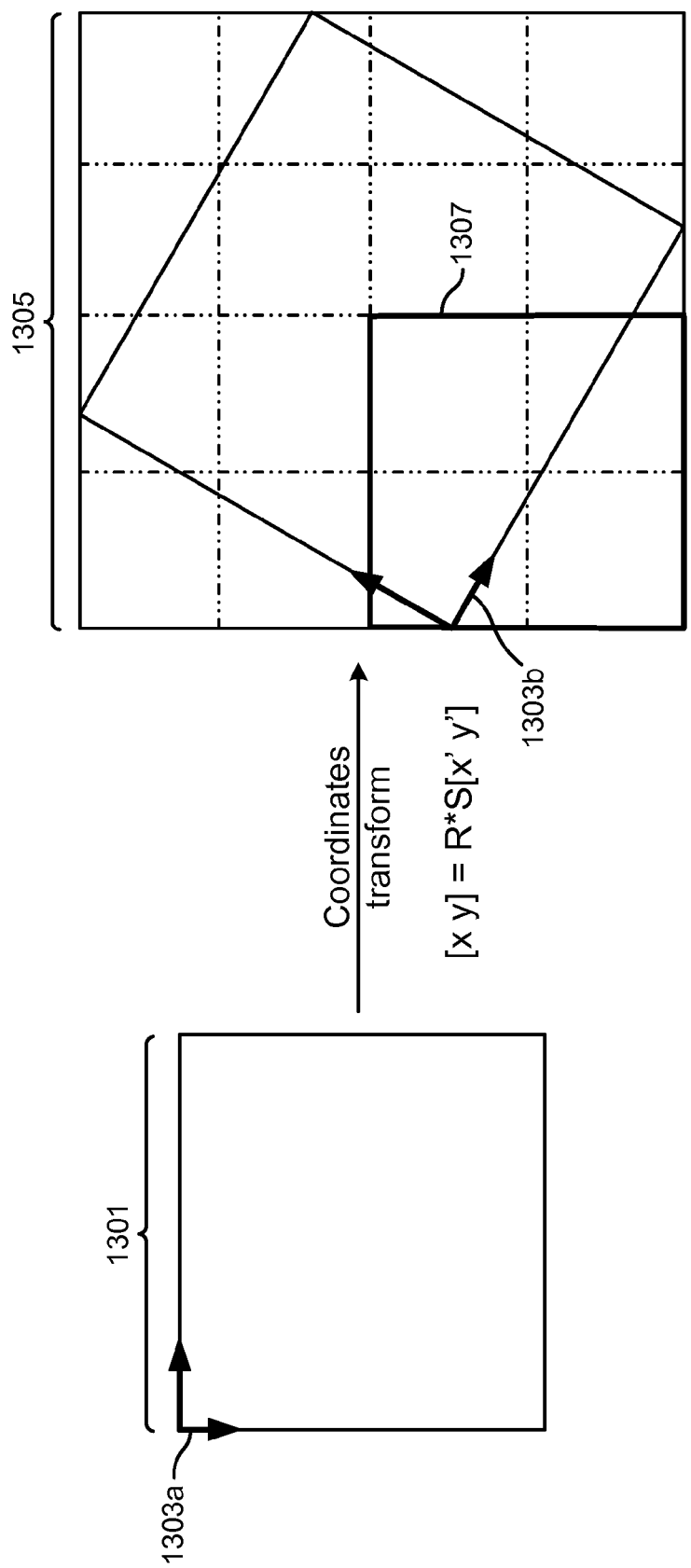
FIG. 13 is a diagram illustrating one example of a size invariant feature transform (SIFT) feature descriptor that may be computed in accordance with the systems and methods disclosed herein.

FIG. 13 is a diagram illustrating one example of a SIFT feature descriptor that may be computed in accordance with the systems and methods disclosed herein. The SIFT feature descriptor is different from BlurD descriptor in cell binning. It applies a bilinear interpolation between adjacent cells. The SIFT feature descriptor may be determined based on the WHOG calculation described herein. In particular, FIG. 13 illustrates a SIFT feature descriptor implementation in accordance with the systems and methods disclosed herein.

For example, a coordinate transform may be computed (by the electronic device 426, for instance). As illustrated in FIG. 13, coordinates 1303a of an object 1301 may be transformed from original coordinates 1305 into transformed coordinates 1303b. More specifically, each of the coordinates may be projected to determine a group of cell bins 1307.

One example of the systems and methods disclosed is given in Listing (5) (which is Hexagon HVX ASM code). Specifically, Listing (5) is an example of SIFT descriptor implementation code on a Hexagon HVX processor. In this example, there are a total of 31 packets for 32 input pixels within the main loop, which achieves 0.97 packet/pixel. This has demonstrated 19× gain compared to 19 packet/pixel of another approach.

Listing (5)

```
{
Loop0(.mainweightHOGloop0,R13)
IF (CMP.GT(R13,#0)) JUMP .remaining
}
.falign
.mainweightHOGloop0:
```

Listing (5)

```
{
    V0 = VMEMU(R_src++#1)           //[load ang31|mod31|...|ang0|mod0 ]
}
{
    V4 = VSPLAT(R10)                //[nx2                            ]
}
{
    V6 = VSPLAT(R11)                //[nx2                            ]
    V1:0 = VZXT(V0.ub)              //[extend mag/phase to halfword   ]
    V5 = V4
}
{
    V2.h = VSUB(V1.b,V14.b)         //[phase – phase0                 ]
    V7 = V6
    V5:4.uw += VMPY(V8.uh,V10.uh)   //[nx + nx_col*i                  ]
}
{
    V2 = VAND(V2,0x255)
    Vtl = VAND(V2,#31)              //[lbint = ang & 31               ]
    V7:6.uw += VMPY(V9.uh,V10.uh)   //[ny + ny_col*i                  ]
}
{
    V4.h =VASR(V5.w,V4.w,#10):rnd:sat //[x_bin:nx_col + 512 >> 10   ]
    Vt = VSUB(#32,Vtl)              //[rbint = 32 – lbint             ]
}
{
    V6.h =VASR(V7.w,V6.w,#10):rnd:sat //[y_bin:ny_col + 512 >> 10   ]
    Vxl = VAND(V4,#31)              //[lbinx = x & 31                 ]
}
{
    V2.h = VASR(V2.h,#5)            //[bint = ang >> 5                ]
    Vx = VSUB(#32,Vxl)              //[rbinx = 32 – x & 31            ]
    Vyl = VAND(V6,#31)              //[lbiny = y & 31                 ]
}
{
    V4.h = VASR(V4.h,#5)            //[binx = x >>5                       ]
    Vy = VSUB(#32,Vyl)              //[rbiny = 32 – y & 31            ]
    Q3 = VCMP.GT(V2,#6)             //[bint > 6 ?                     ]
    V3.h = VADD(V2.h,#1)            //[upper phase bin                ]
}
{
    V6.h = VASR(V6.h,#5)            //[biny = y >>5                   ]
    V4.h = VADD(V4.h,#2)            //[center offset     ]
    V3 = VMUX(Q3 ,#0,V3)            //[wrap phase bin to 0~7          ]
}
{
    V6.h = VADD(V6.h,#2)            //[center offset     ]
    V12 = V4                        //[(binx + 2)        ]
}
{
    V12.h += VMPYI(V6.h,#4)         //[(biny + 2)*4 + (binx + 2)   ]
}
{
    Q2 = VCMP.GT(V12.h,#15)         //[check_out_of_boundary          ]
    Vw.h = VMPYI(Vy.h,Vt.h)         //[rdy*rdt           ]
}
{
    V12.h = VASL(V12.h,#3)          //[((biny+2)*4 + (binx+2))* 8 ]
    Vw0.h = VMPYI(Vw.h,Vx.h)        //[rdy*rdt*rdx
}
{
    V12.h = VADD(V12.h,V2.h)        //[((biny+2)*4+(binx+2))*8+bint ]
    Vw1.h = VMPYI(Vw.h,Vxl.h)       //[rdy*rdt*(32-rdx)               ]
    V4 = V12                        //[((biny+2)*4 + (binx+2)) * 8 ]
    Vw0 = VMUX(Q2, #0,Vw0)          //[rdy*rdt*rdx                    ]
}
{
    V13.h = VADD(V12.h,#8)          //[((biny+2)*4+(binx+2+1))*8+bint]
    V14.h = VADD(V12.h,#32)         //[((biny+2+1)*4+(binx+2))*8+bint]
    Vw.h = VMPYI(Vyl.h,Vt.h)        //[(32-rdy)*rdt      ]
}
{
    V15.h = VADD(V13.h,#32)         //[((biny+2+1)*4+(binx+2+1))*8+bint]
    Q3 = VCMP.GT(V13.h,#127)        //[check_out_of_boundary          ]
    Q2 = VCMP.GT(V14.h,#127)        //[check_out_of_boundary          ]
}
{
```

Listing (5)

```
    Vw1 = VMUX(Q3, #0,Vw1)        //[rdy*rdt*(32-rdx)              ]
    Q3 = VCMP.GT(V15.h,#127)      //[check_out_of_boundary         ]
    V5.b = VPACK(V13.h,V12.h):SAT
}
{
    WHOG(V5,Vw1:Vw0)
}
{
    V5.b = VPACK(V15.h,V14.h):SAT
    Vw0.h = VMPYI(Vw.h,Vx.h)      //[(32-rdy)*rdt*rdx              ]
V12.h = VADD(V4.h,V3.h)           //[((biny+2)*4+(binx+2))*8+bint+1 ]
}
{
    Vw1.h = VMPYI(Vw.h,Vxl.h)     //[(32-rdy)*rdt*(32-rdx)         ]
    Vw0 = VMUX(Q2, #0,Vw0)        //[(32-rdy)*rdt*rdx              ]
    V13.h = VADD(V13.h,#8)        //[((biny+2)*4+(binx+2+1))*8+bint+1 ]
    Q2 = VCMP.GT(V12.h,#127)      //[check_out_of_boundary         ]
}
{
    Vw1 = VMUX(Q3, #0,Vw1)        //[(32-rdy)*rdt*(32-rdx)         ]
V14.h = VADD(V12.h,#32)           //[((biny+2+1)*4+(binx+2))*8+bint+1 ]
    V15.h = VADD(V13.h,#32)       //[((biny+2+1)*4+(binx+2+1))*8+bint+1 ]
    Vw.h = VMPYI(Vy.h,Vtl.h)      //[rdy*(32-rdt)                  ]
}
{
    WHOG(V5,Vw1:Vw)
}
{
    Q3 = VCMP.GT(V13.h,#127)      //[check_out_of_boundary         ]
    Vw0.h = VMPYI(Vw.h,Vx.h)      //[rdy*(32-rdt)*rdx              ]
}
{
    Vw1.h = VMPYI(Vw.h,Vxl.h)     //[rdy*(32-rdt)*(32-rdx)         ]
    Vw0 = VMUX(Q2, #0,Vw0)        //[rdy*(32-rdt)*rdx              ]
    V5.b = VPACK(V13.h,V12.h):SAT
    Q2 = VCMP.GT(V14.h,#127)      //[check_out_of_boundary         ]
}
{
    Vw1 = VMUX(Q3, #0,Vw1)        //[rdy*(32-rdt)*(32-rdx)         ]
    Q3 = VCMP.GT(V15.h,#127)      //[check_out_of_boundary         ]
    Vw.h = VMPYI(Vyl.h,Vtl.h)     //[(32-rdy)*(32-rdt)             ]
}
{
    WHOG(V5,Vw1:Vw)
}
{
    Vw0.h = VMPYI(Vw.h,Vx.h)      //[(32-rdy)*(32-rdt)*rdx         ]
}
{
    Vw1.h = VMPYI(Vw.h,Vxl.h)     //[(32-rdy)*(32-rdt)*(32-rdx) ]
    Vw0 = VMUX(Q2, #0,Vw0)        //[(32-rdy)*(32-rdt)*rdx         ]
    V5.b = VPACK(V15.h,V14.h):SAT
}
{
    Vw1 = VMUX(Q3, #0,Vw1)        //[(32-rdy)*(32-rdt)*(32-rdx) ]
}
{
    WHOG(V5,Vw1:Vw)
}:endloop0
```

Figure 14:
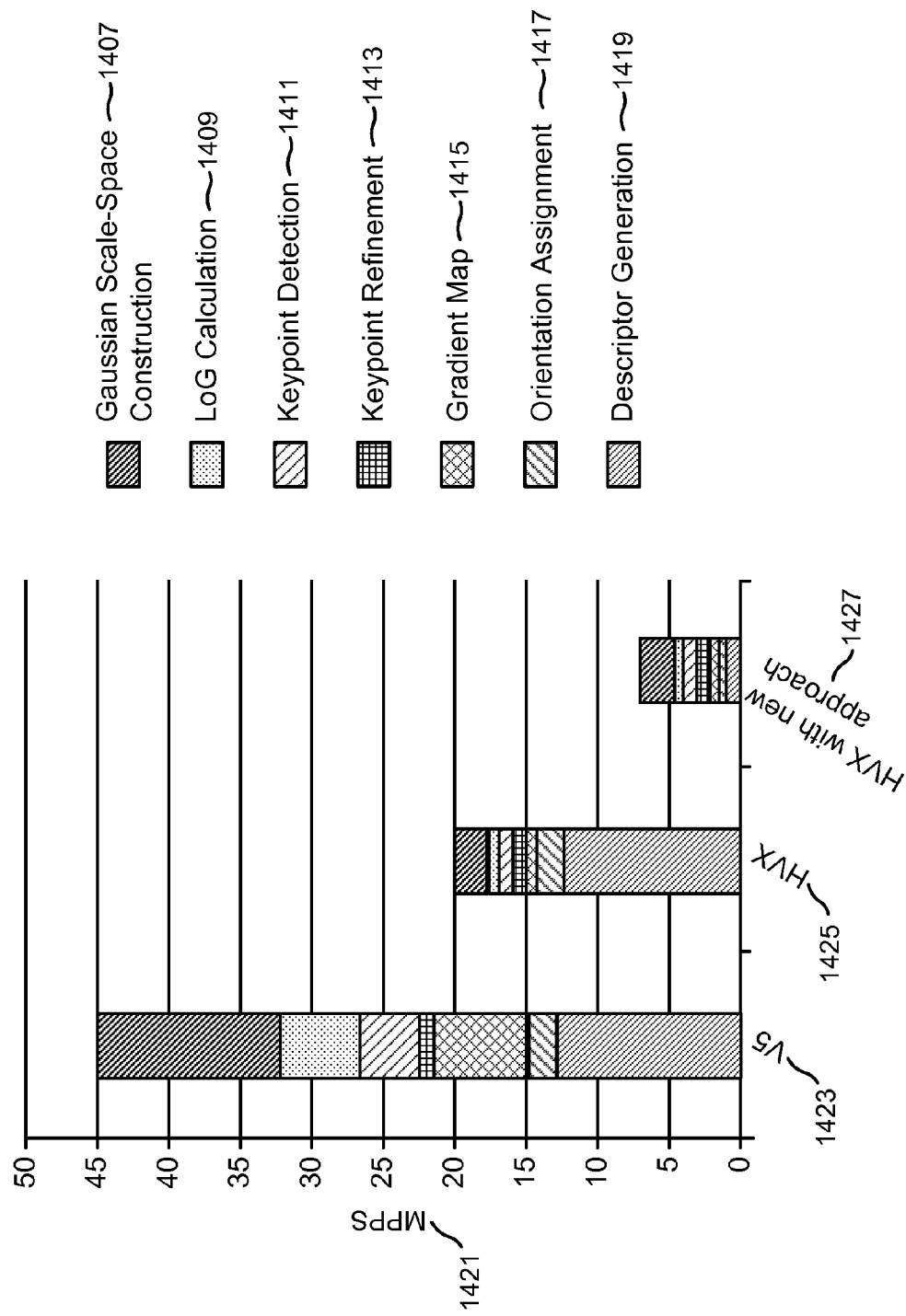
FIG. 14 is a graph illustrating a performance benefit of the systems and methods disclosed herein.

FIG. 14 is a graph illustrating a performance benefit of the systems and methods disclosed herein. Specifically, the graph illustrates several operations (e.g., modules) for BlurD/SIFT computation. The operations include Gaussian scale-space construction 1407, Laplacian of Gaussian (LoG) filter calculation 1409, keypoint detection 1411, keypoint refinement 1413, gradient map computation 1415, orientation assignment 1417 and descriptor generation 1419. For an overall BlurD/SIFT algorithm implemented in Hexagon/HVX, with most modules accelerated by SIMD instructions on HVX, the descriptor generation takes the dominant number of cycles. Take overall BlurD as an example as illustrated in the graph. On Hexagon V5 1423, the descriptor generation 1419 takes 30% of total million packets per second (MPPS). In Hexagon (which may be very long instruction word (VLIW)), for example, each packet may contain up to 4 instructions. MPPS may be considered similar to million instructions per second (MIPS) of other processors. With most pixel-processing functions optimized on Hexagon V60/HVX 1425 with a more powerful instruction set, the descriptor generation 1419 portion increases to as high as 65% due to non-vectorizable calculations. With the systems and methods disclosed herein implemented as SIMD instructions on a Hexagon processor 1427, the descriptor generation 1419 may drop to 20%.

More detail regarding the performance benefits of the systems and methods disclosed herein are given as follows. WHOG computation performance (for 16-bit weights) for different approaches was observed. The approach described in connection with FIG. 8 yielded 64 packets/64 pixels, while the systems and methods disclosed herein (based on a register length of 512 bits) yielded 4 packets/64 pixels for an improvement of 16×.

BlurD descriptor computation performance for different approaches was also observed. The approach described in connection with FIG. 8 yielded 12,590 packets/descriptor, while the systems and methods disclosed herein (based on a register length of 512 bits) yielded 1,152 packets/descriptor for an improvement of 10.9×.

SIFT descriptor computation performance for different approaches was also observed. The approach described in connection with FIG. 8 yielded 27,033 packets/descriptor, while the systems and methods disclosed herein (based on a register length of 512 bits) yielded 2,816 packets/descriptor for an improvement of 9.6×.

As described above, some configurations of the systems and methods disclosed herein may be implemented for object detection, robotic mapping/navigation, image stitching, 3D modeling, gesture recognition and/or video tracking. For example, some configurations may be implemented for object recognition. For instance, given a SIFT ability to find distinctive keypoints that are invariant to location, to scale, to rotation, to affine transformation and/or to changes in illumination, the systems and methods disclosed herein may increase the performance (e.g., speed, efficiency, etc.) of object recognition processing.

In some configurations, SIFT features may be extracted from an input image. These features may be matched to the SIFT feature obtained from training images. When a matching scheme is provided, the input image may be classified and/or recognized from known objects/classes. SIFT features may be applied to any task that requires identification of matching locations between images. Accordingly, the systems and methods disclosed herein may be implemented in recognition tasks of particular object categories in 2D images, 3D reconstruction, motion tracking and segmentation, robot localization, image panorama stitching and/or epipolar calibration. It should be noted that the systems and methods disclosed herein may improve the functioning of a processor (e.g., computer) by allowing processing tasks to be completed more quickly and/or more efficiently. Some configurations of the systems and methods disclosed herein may also relate to technology outside of generic computing. For example, some configurations of the systems and methods disclosed herein may relate to image processing, object detection and/or recognition, object tracking, etc.

Figure 15:
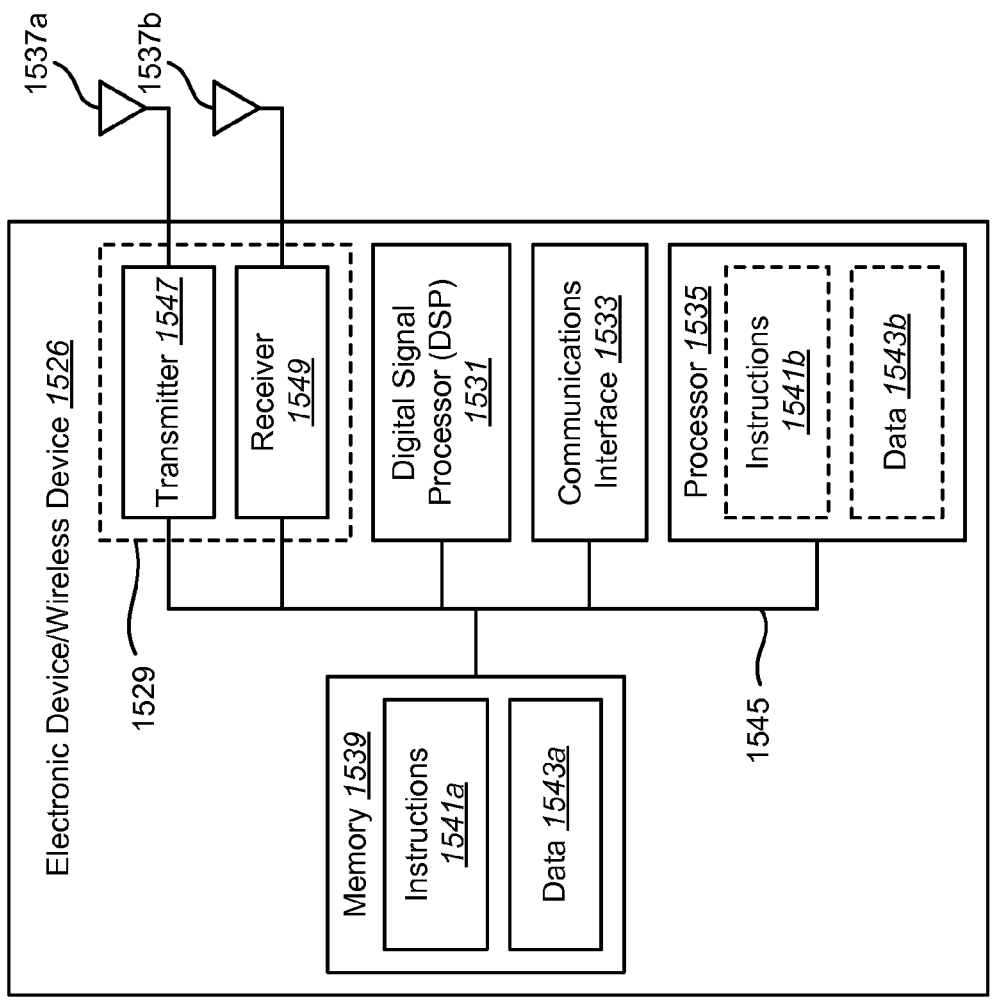
FIG. 15 illustrates certain components that may be included within an electronic device and/or wireless device.

FIG. 15 illustrates certain components that may be included within an electronic device and/or wireless device 1526. The electronic device/wireless device 1526 may be an access terminal, a mobile station, a user equipment (UE), a smartphone, a digital camera, a video camera, a tablet device, a laptop computer, etc. The electronic device/wireless device 1526 may be implemented in accordance with the electronic device 426 described in connection with FIG. 4. The electronic device/wireless device 1526 includes a processor 1535. The processor 1535 may be a general purpose single- or multi-chip microprocessor (e.g., an ARM), a special purpose microprocessor (e.g., a digital signal processor (DSP)), a microcontroller, a programmable gate array, etc. The processor 1535 may be referred to as a central processing unit (CPU). Although just a single processor 1535 is shown in the electronic device/wireless device 1526, in an alternative configuration, a combination of processors (e.g., an ARM and DSP) could be used.

The electronic device/wireless device 1526 also includes memory 1539. The memory 1539 may be any electronic component capable of storing electronic information. The memory 1539 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1543a and instructions 1541a may be stored in the memory 1539. The instructions 1541a may be executable by the processor 1535 to implement one or more of the methods described herein. Executing the instructions 1541a may involve the use of the data that is stored in the memory 1539. When the processor 1535 executes the instructions 1541, various portions of the instructions 1541b may be loaded onto the processor 1535, and various pieces of data 1543b may be loaded onto the processor 1535.

The electronic device/wireless device 1526 may also include a transmitter 1547 and a receiver 1549 to allow transmission and reception of signals to and from the electronic device/wireless device 1526. The transmitter 1547 and receiver 1549 may be collectively referred to as a transceiver 1529. Multiple antennas 1537a-b may be electrically coupled to the transceiver 1529. The electronic device/wireless device 1526 may also include (not shown) multiple transmitters, multiple receivers, multiple transceivers and/or additional antennas.

The electronic device/wireless device 1526 may include a digital signal processor (DSP) 1531. The electronic device/wireless device 1526 may also include a communications interface 1533. The communications interface 1533 may enable one or more kinds of input and/or output. For example, the communications interface 1533 may include one or more ports and/or communication devices for linking other devices to the electronic device/wireless device 1526. Additionally or alternatively, the communications interface 1933 may include one or more other interfaces (e.g., touchscreen, keypad, keyboard, microphone, camera, etc.). For example, the communication interface 1533 may enable a user to interact with the electronic device/wireless device 1526.

The various components of the electronic device/wireless device 1526 may be coupled together by one or more buses, which may include a power bus, a control signal bus, a status signal bus, a data bus, etc. For the sake of clarity, the various buses are illustrated in FIG. 15 as a bus system 1545.

In accordance with the present disclosure, a circuit, in an electronic device, may be adapted to load histogram bin indexes into a first register. The same circuit, a different circuit, or a second section of the same or different circuit may be adapted to load weights into a second register. The second section may advantageously be coupled to the first section, or it may be embodied in the same circuit as the first section. In addition, the same circuit, a different circuit, or a third section of the same or different circuit may be adapted to update an entire histogram table in a register file based on the histogram bin indexes and the weights without storing any histogram bin to memory, where histogram bins are updated in parallel with a single instruction. In addition, the same circuit, a different circuit, or a fourth section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for calculating a feature descriptor on a single instruction, multiple data (SIMD) processor, comprising:
    storing an entire histogram table in a register file on the SIMD processor;
    generating histogram bin indexes in a first register on the SIMD processor;
    generating weights in a second register on the SIMD processor; and
    updating the entire histogram table in the register file based on the histogram bin indexes and the weights without storing any histogram bin in the histogram table to memory, wherein histogram bins in the histogram table are updated in parallel with a single instruction in a single cycle of the SIMD processor.

2. The method of claim 1, wherein each histogram bin index in the first register includes a first subset of bits and a second subset of bits, wherein the first subset of bits indicates a register in the register file and the second subset of bits indicates an element of the register.

3. The method of claim 1, wherein each histogram in the histogram table corresponds to a cell of pixels in an image.

4. The method of claim 1, wherein each histogram in the histogram table is a weighted histogram of gradients (HOG).

5. The method of claim 1, wherein the entire histogram table is not stored in the memory after being updated.

6. The method of claim 1, wherein updating the entire histogram table comprises accumulating weighted values in one or more of the histogram bins.

7. The method of claim 1, further comprising calculating a BlurD feature descriptor or scale invariant feature transform (SIFT) feature descriptor based on the entire histogram table.

8. The method of claim 1, wherein each histogram in the histogram table is stored in the register file as a vector.

9. The method of claim 1, wherein the entire histogram table is stored in a set of consecutive registers in the register file.

10. An electronic device for calculating a feature descriptor, comprising:
- a single instruction, multiple data (SIMD) processor;
- memory in electronic communication with the SIMD processor;
- instructions stored in memory, the instructions being executable to:
  - store an entire histogram table in a register file on the SIMD processor;
  - generate histogram bin indexes in a first register on the SIMD processor;
  - generate weights in a second register on the SIMD processor; and
  - update the entire histogram table in the register file based on the histogram bin indexes and the weights without storing any histogram bin in the histogram table to memory, wherein histogram bins in the histogram table are updated in parallel with a single instruction in a single cycle of the SIMD processor.

11. The electronic device of claim 10, wherein each histogram bin index in the first register includes a first subset of bits and a second subset of bits, wherein the first subset of bits indicates a register in the register file and the second subset of bits indicates an element of the register.

12. The electronic device of claim 10, wherein each histogram in the histogram table corresponds to a cell of pixels in an image.

13. The electronic device of claim 10, wherein each histogram in the histogram table is a weighted histogram of gradients (HOG).

14. The electronic device of claim 10, wherein the entire histogram table is not stored in the memory after being updated.

15. The electronic device of claim 10, wherein updating the entire histogram table comprises accumulating weighted values in one or more of the histogram bins.

16. The electronic device of claim 10, wherein the instructions are further executable to calculate a BlurD feature descriptor or scale invariant feature transform (SIFT) feature descriptor based on the entire histogram table.

17. The electronic device of claim 10, wherein each histogram in the histogram table is stored in the register file as a vector.

18. The electronic device of claim 10, wherein the entire histogram table is stored in a set of consecutive registers in the register file.

19. A computer-program product for calculating a feature descriptor, comprising a non-transitory computer-readable medium having instructions thereon, the instructions comprising:
- code for causing an electronic device to store an entire histogram table in a register file on a single instruction, multiple data (SIMD) processor;
- code for causing the electronic device to generate histogram bin indexes in a first register on the SIMD processor;
- code for causing the electronic device to generate weights in a second register on the SIMD processor; and
- code for causing the electronic device to update the entire histogram table in the register file based on the histogram bin indexes and the weights without storing any histogram bin in the histogram table to memory, wherein histogram bins in the histogram table are updated in parallel with a single instruction in a single cycle of the SIMD processor.

20. The computer-program product of claim 19, wherein each histogram bin index in the first register includes a first subset of bits and a second subset of bits, wherein the first subset of bits indicates a register in the register file and the second subset of bits indicates an element of the register.

21. The method of claim 1, wherein histogram bin indexes indicate which bins to update in the entire histogram table as a result of orientation binning according to gradient information.

* * * * *